Feb. 15, 1927. G. INNES Re. 16,552

GRAIN SHOCKER

Original Filed Dec. 23, 1919 17 Sheets-Sheet 1

Inventor—
George Innes.
by his Attorneys—
Howson & Howson

Feb. 15, 1927. G. INNES Re. 16,552

GRAIN SHOCKER

Original Filed Dec. 23, 1919 17 Sheets-Sheet 2

Inventor—
George Innes.
by his Attorneys—
Howson & Howson

Feb. 15, 1927. G. INNES Re. 16,552

GRAIN SHOCKER

Original Filed Dec. 23, 1919 17 Sheets-Sheet 3

Inventor—
George Innes
by his Attorneys—
Howson & Howson

Feb. 15, 1927. G. INNES Re. 16,552
GRAIN SHOCKER
Original Filed Dec. 23, 1919 17 Sheets-Sheet 4
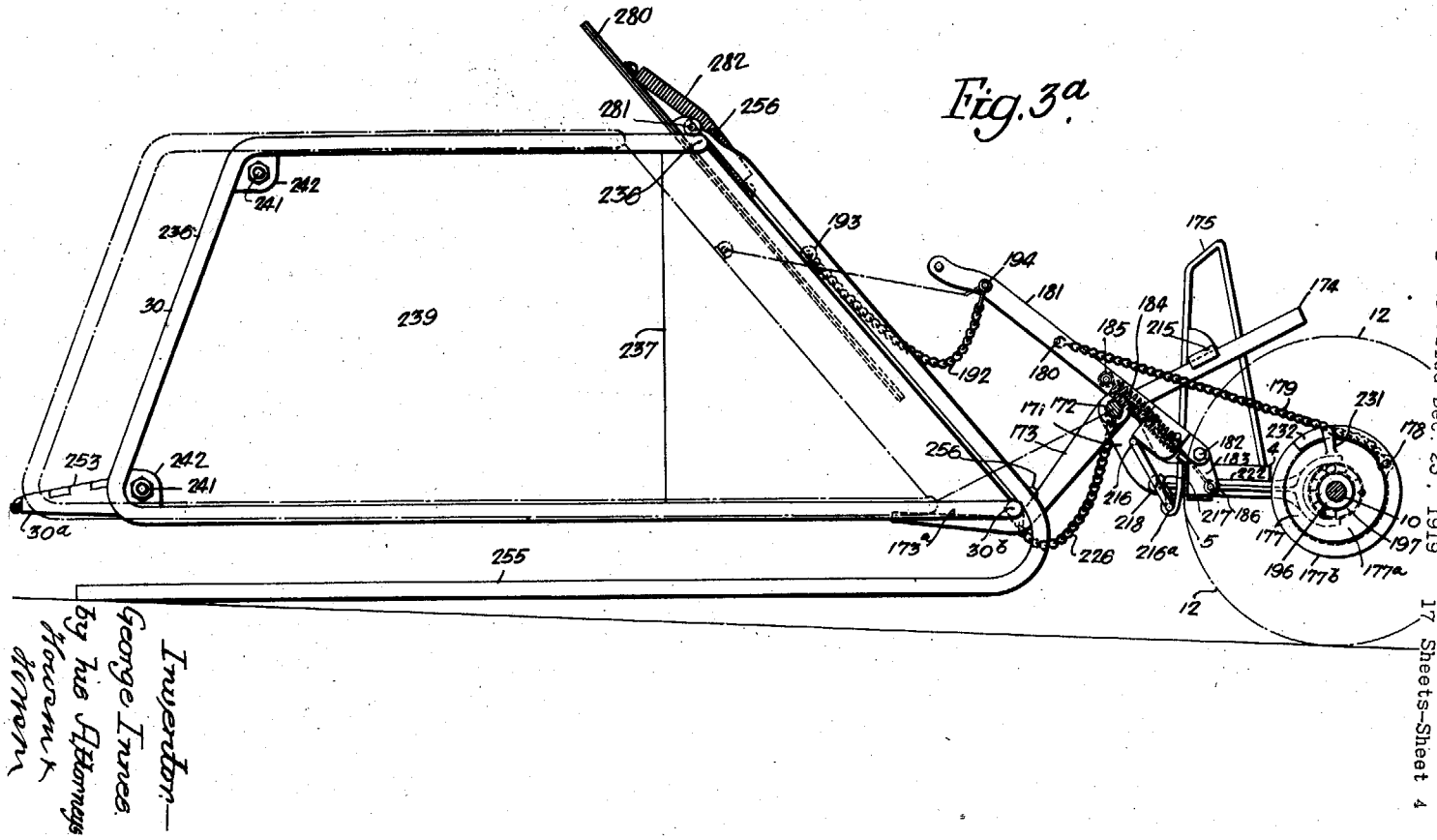
Inventor—
George Innes
By his Attorneys
Howson & Howson Feb. 15, 1927. G. INNES Re. 16,552

GRAIN SHOCKER

Original Filed Dec. 23, 1919 17 Sheets-Sheet 5

Inventor-
George Innes.
by his Attorneys
Howson & Howson

Feb. 15, 1927. G. INNES Re. 16,552
GRAIN SHOCKER
Original Filed Dec. 23, 1919 17 Sheets-Sheet 6
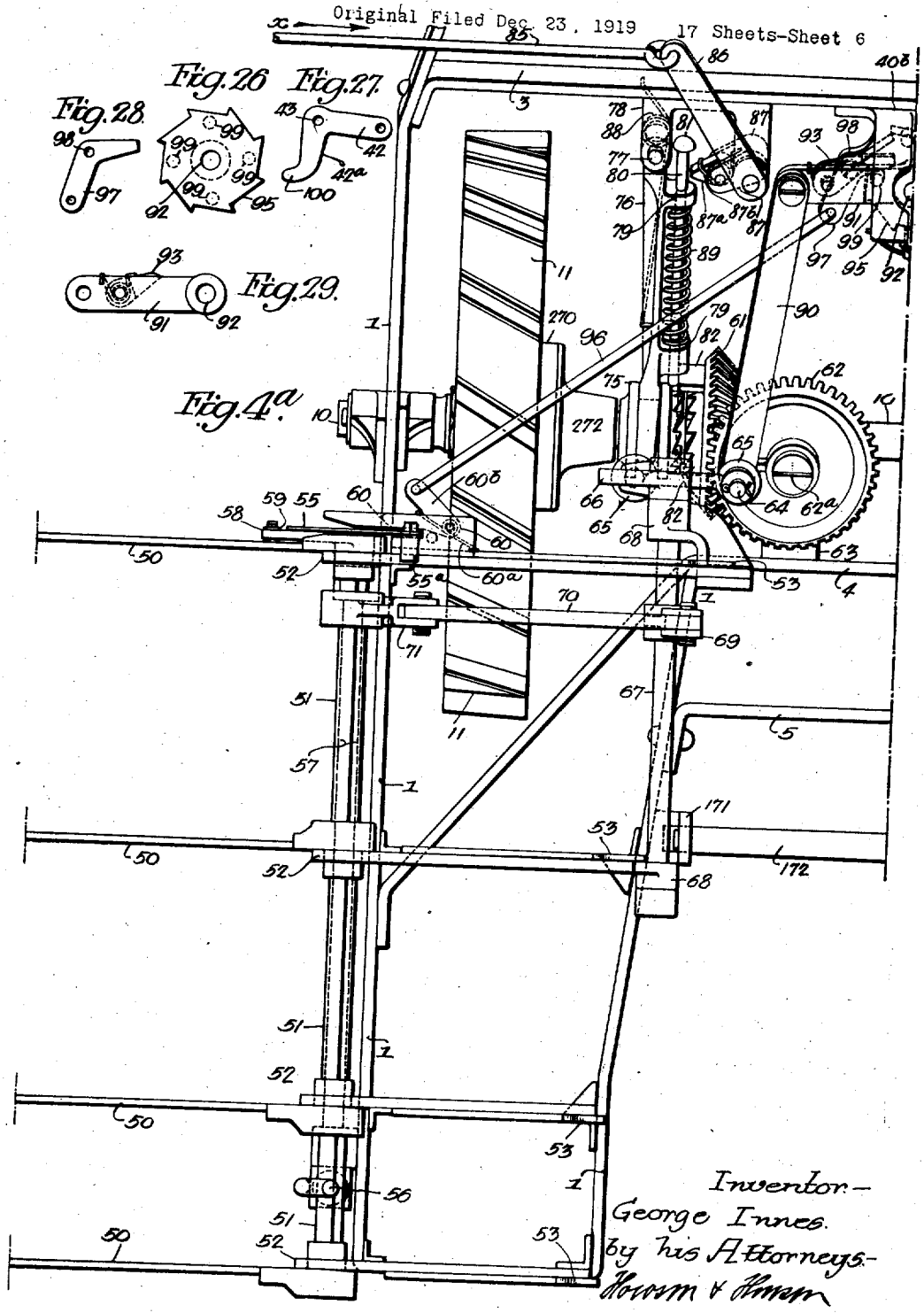

Feb. 15, 1927. G. INNES Re. 16,552
GRAIN SHOCKER
Original Filed Dec. 23, 1919 17 Sheets-Sheet 7
Fig. 4b.
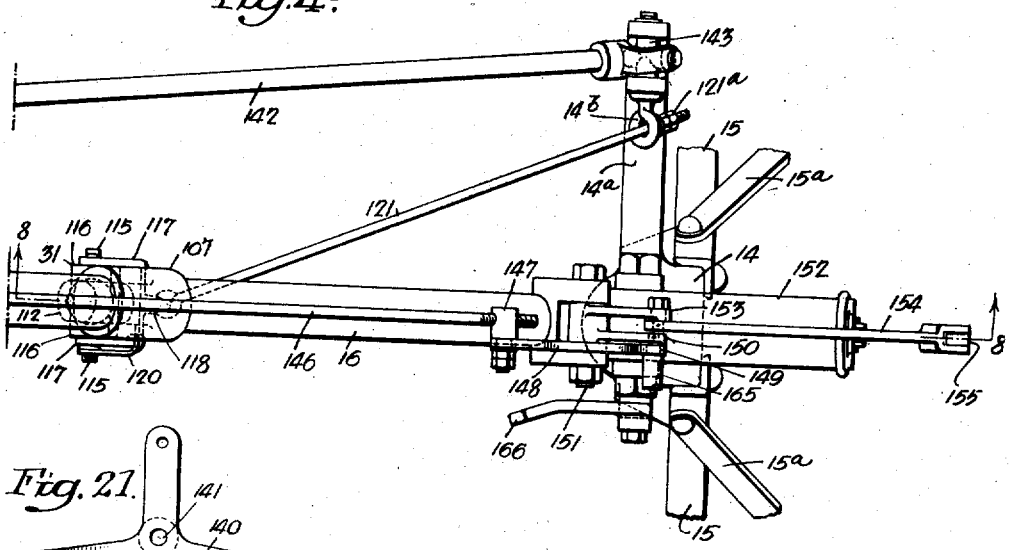
Fig. 21.
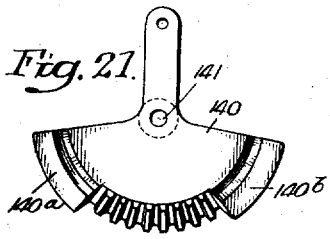
Fig. 22.
Fig. 7.
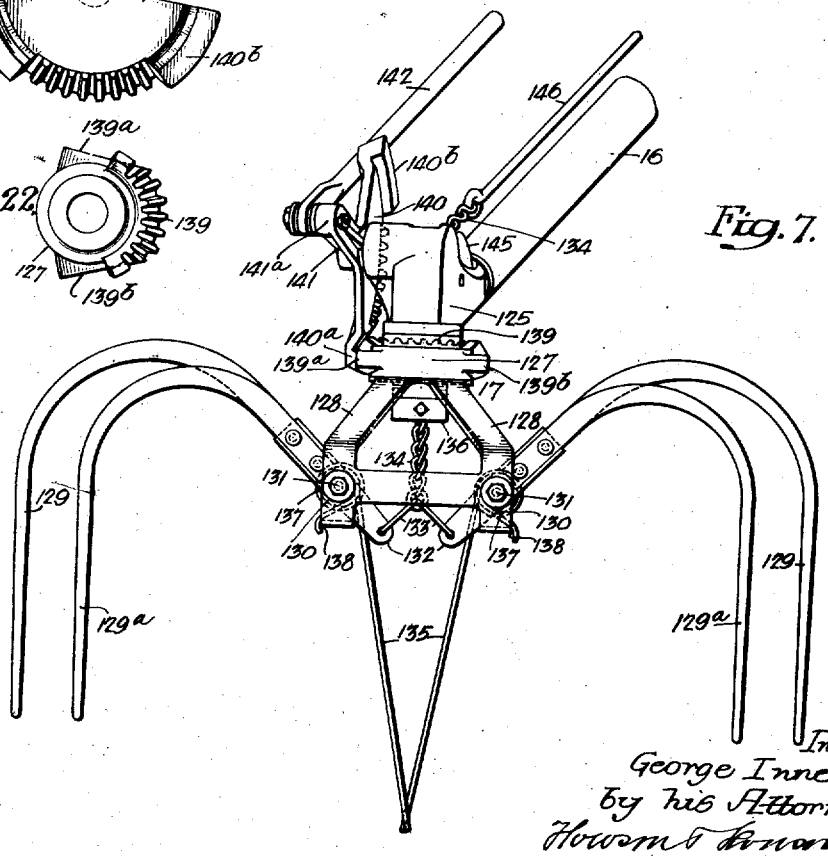
Inventor:
George Innes
by his Attorneys:
Howson & Howson Feb. 15, 1927. G. INNES Re. 16,552
GRAIN SHOCKER
Original Filed Dec. 23, 1919 17 Sheets-Sheet 8
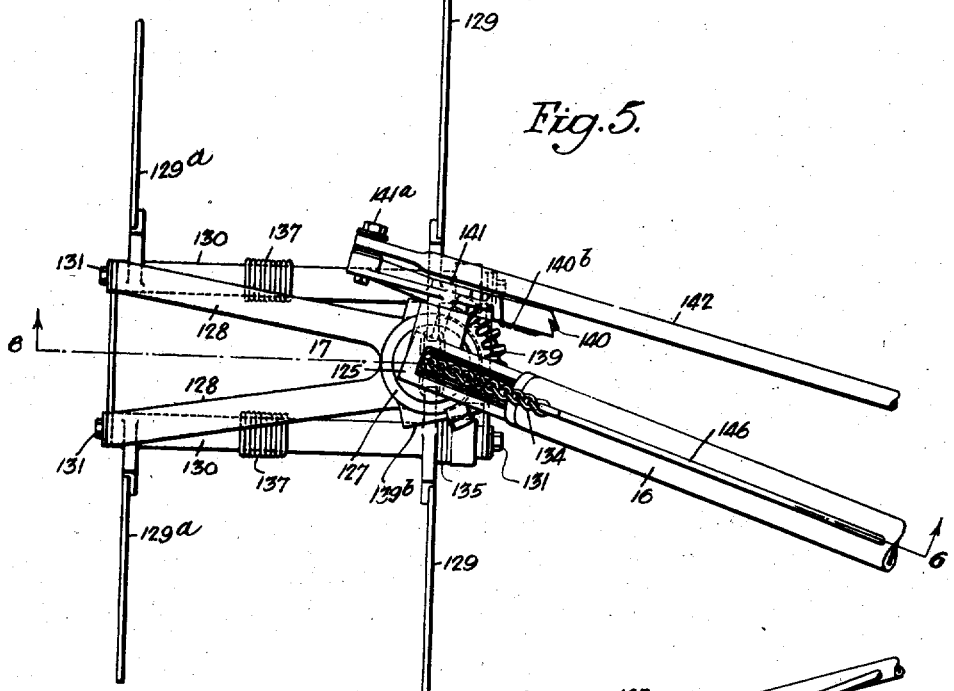
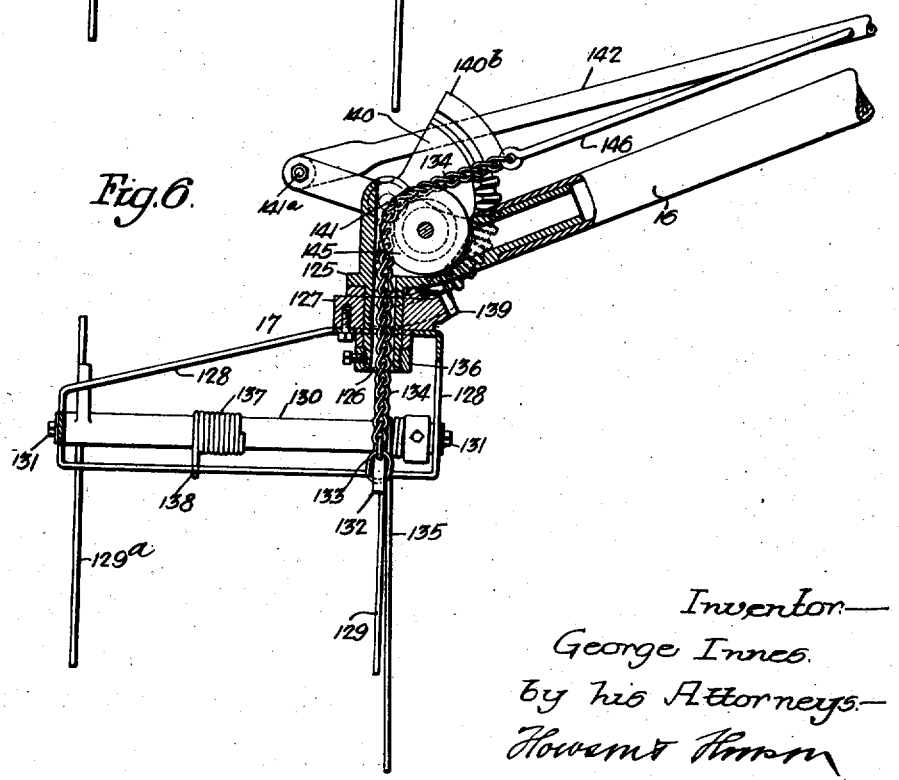
Inventor—
George Innes.
by his Attorneys—
Howson & Howson Feb. 15, 1927. G. INNES Re. 16,552
GRAIN SHOCKER
Original Filed Dec. 23, 1919 17 Sheets-Sheet 9
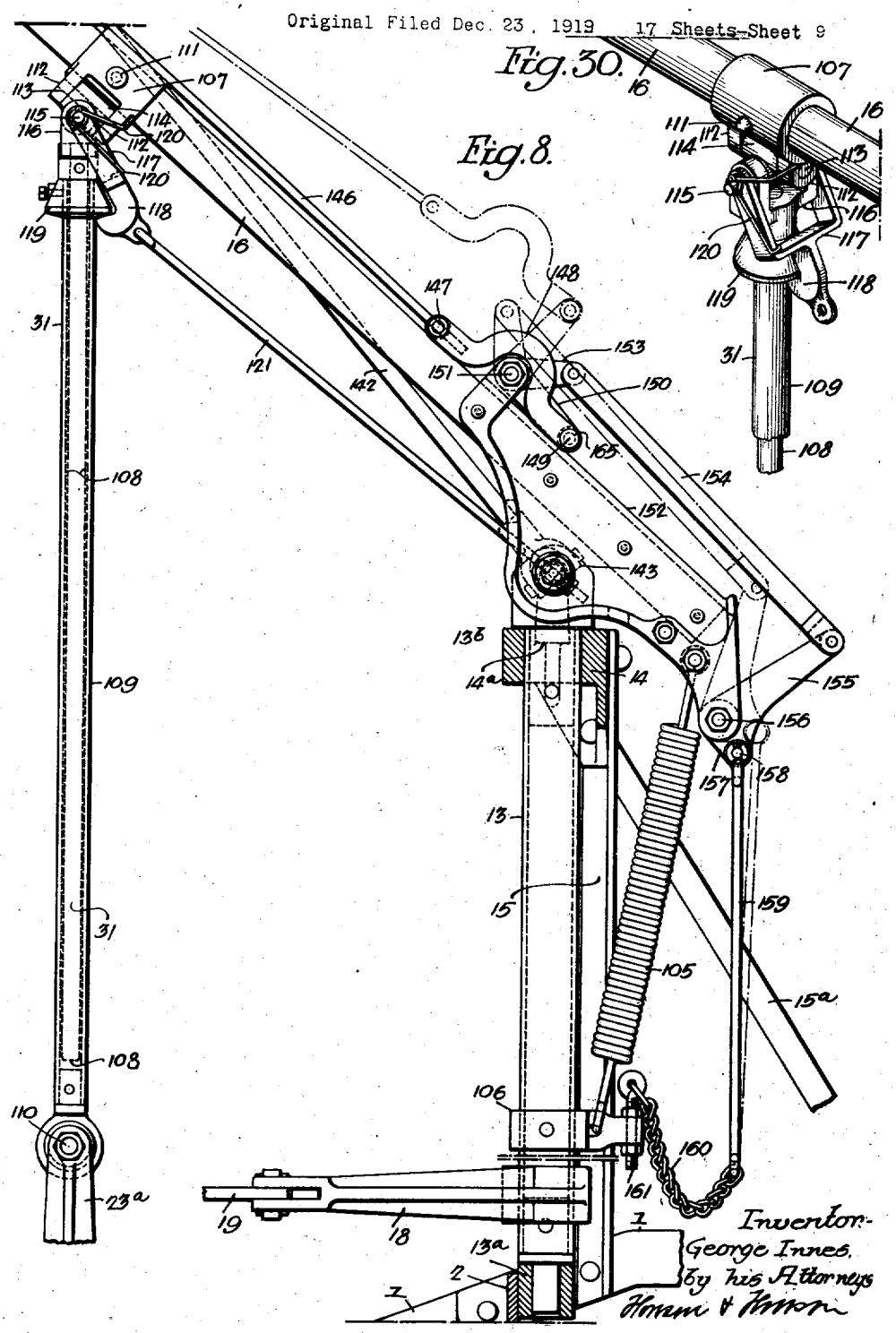

Feb. 15, 1927. G. INNES Re. 16,552

GRAIN SHOCKER

Original Filed Dec. 23, 1919 17 Sheets-Sheet 10

Inventor-
George Innes.
by his Attorneys-
Howson & Howson

Feb. 15, 1927. G. INNES Re. 16,552

GRAIN SHOCKER

Original Filed Dec. 23, 1919 17 Sheets-Sheet 11

Inventor
George Innes.
By his Attorneys—Howson & Howson

Feb. 15, 1927. G. INNES Re. 16,552

GRAIN SHOCKER

Original Filed Dec. 23, 1919 17 Sheets-Sheet 12

Feb. 15, 1927. G. INNES Re. 16,552

GRAIN SHOCKER

Original Filed Dec. 23, 1919 17 Sheets-Sheet 13

Inventor—
George Innes.
by his Attorneys:
Howson & Howson

Feb. 15, 1927. G. INNES Re. 16,552

GRAIN SHOCKER

Original Filed Dec. 23, 1919. 17 Sheets-Sheet 14

Inventor:—
George Innes.
by his Attorneys
Howson & Howson

Feb. 15, 1927. G. INNES Re. 16,552

GRAIN SHOCKER

Original Filed Dec. 23, 1919 17 Sheets-Sheet 15

Inventor—
George Innes.
by his Attorneys.
Howson & Howson

Feb. 15, 1927. G. INNES Re. 16,552
GRAIN SHOCKER
Original Filed Dec. 23, 1919 17 Sheets-Sheet 16
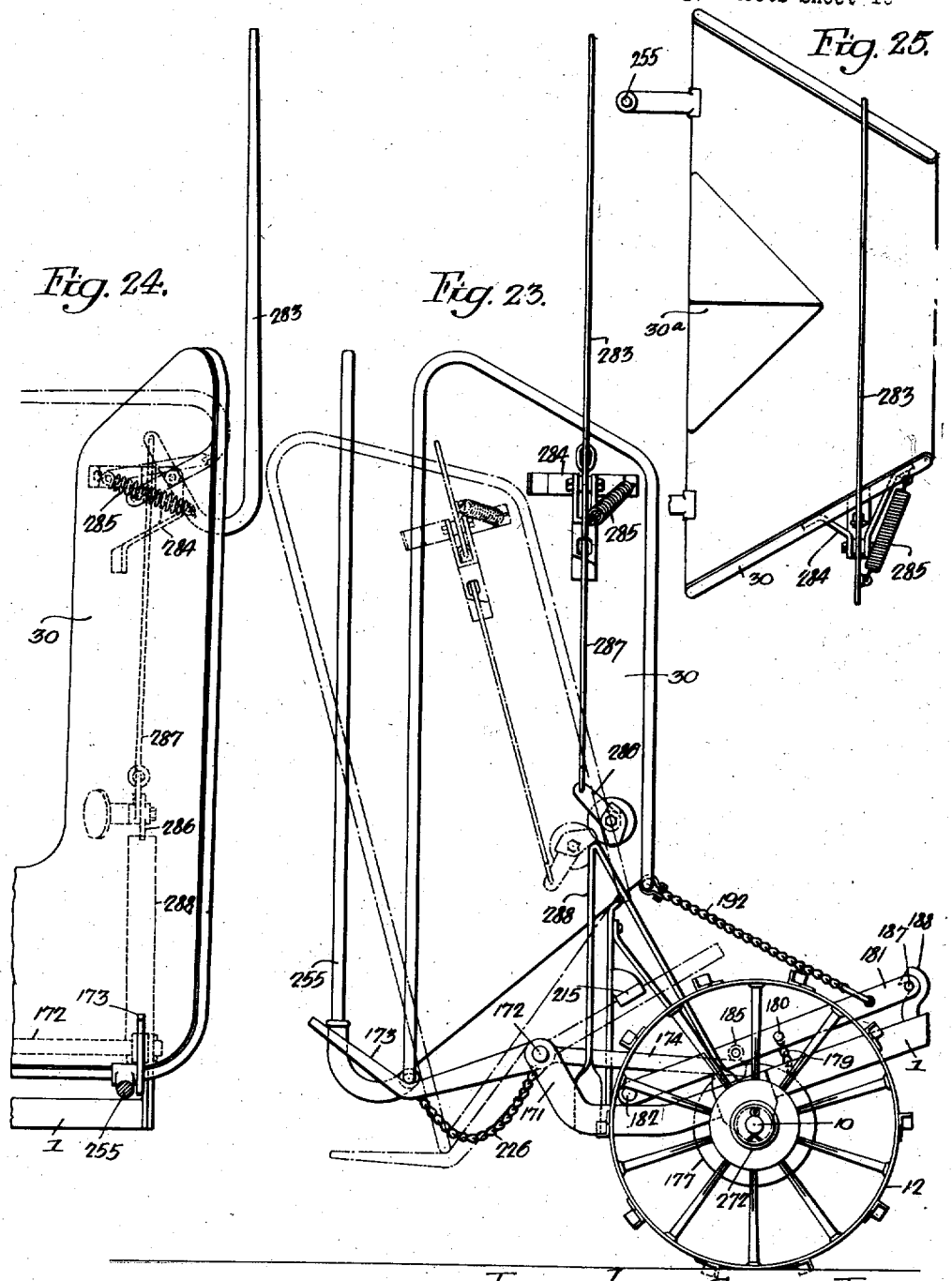
Inventor— George Innes,
by his Attorneys— Pierson & Pierson Feb. 15, 1927. G. INNES Re. 16,552

GRAIN SHOCKER

Original Filed Dec. 23, 1919 17 Sheets-Sheet 17

Inventor—
George Innes.
by his Attorneys.—
Howson & Howson

Reissued Feb. 15, 1927. Re. 16,552

UNITED STATES PATENT OFFICE.

GEORGE INNES, OF DAVENPORT, IOWA, ASSIGNOR TO INNES SHOCKER COMPANY, OF PHILADELPHIA, PENNSYLVANIA, A CORPORATION OF DELAWARE.

GRAIN SHOCKER.

Original application filed December 23, 1919, Serial No. 346,843. Divided and application filed January 6, 1920, Serial No. 349,706. Original No. 1,512,769, dated October 21, 1924. Application for reissue filed August 12, 1926. Serial No. 128,884.

My invention relates to certain improvements in machines for shocking grain as it is received from a reaper and binder; and my present invention relates particularly to the mechanism for collecting the bundles and delivering the bundles to a basket, which, when loaded with a certain number of bundles, is allowed to fall and discharge its load on to the ground.

One object of my invention is to design a machine of this character that will be accurate in operation, and will deliver the bundles two at a time to the basket.

A further object of the invention is to provide means for collecting the bundles, and to receive the bundles from the binder in such a manner that the heads of the bundles will be in contact or intermesh, while the butts of the bundles will be separated.

A still further object of the invention is to provide means for carrying the bundles from the cradle into which the bundles are placed, to the basket, reversing the bundles, and at the same time holding them in the relation that they were assembled in the cradle.

The invention relates also to improvements in the mechanisms by which the above operations are accomplished.

In the accompanying drawings,—

Figure 3:
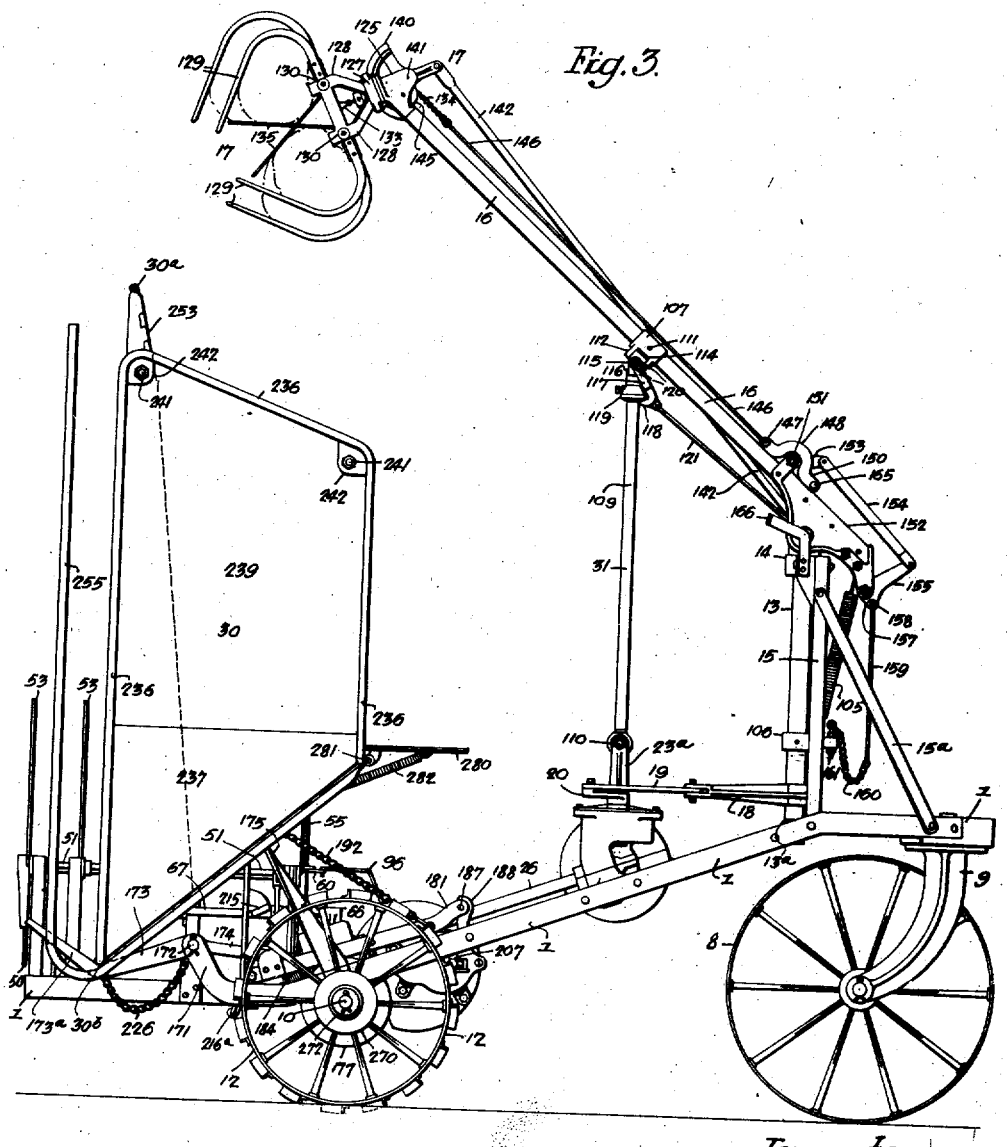
Fig. 3 is a side elevation.

Fig. 3[a] is a view similar to Fig. 3 drawn from an enlarged scale, showing the basket after falling to the ground.

Figures 4, 17:
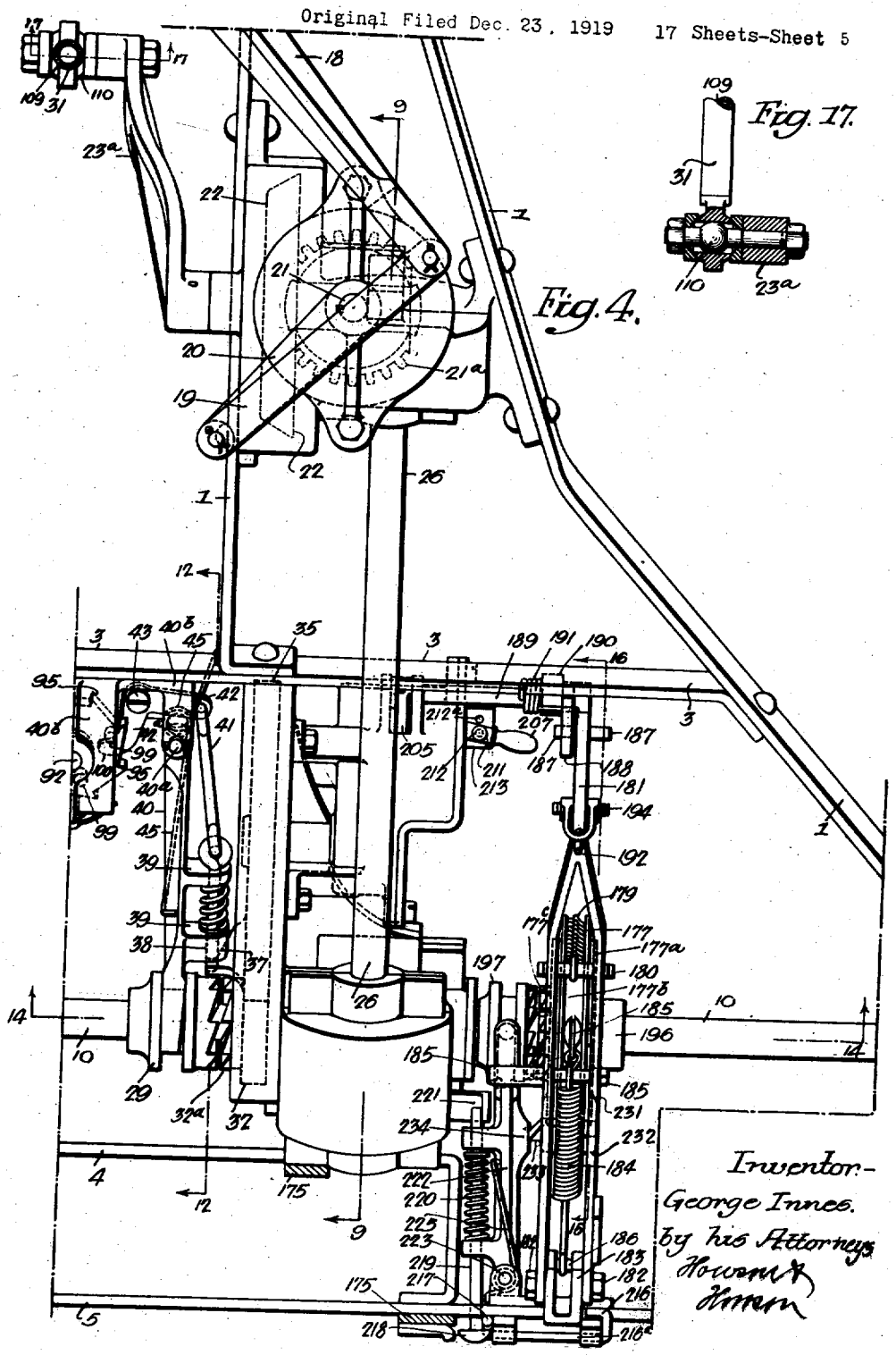

Fig. 4 is an enlarged plan view of a part of the operating mechanism.

Fig. 4[a] is a plan view showing the other part of the operating mechanism.

Fig. 4[b] is a plan view of the forward end of the machine. These three figures are all on the same scale.

Fig. 5 is a plan view of the gripping mechanism for engaging the bundles and transferring them to the basket.

Fig. 6 is a sectional view on line 6—6, Fig. 5.

Fig. 7 is a front view of the gripping mechanism.

Fig. 8 is an enlarged view illustrating the mast and a part of the boom.

Figures 9, 10, 11:
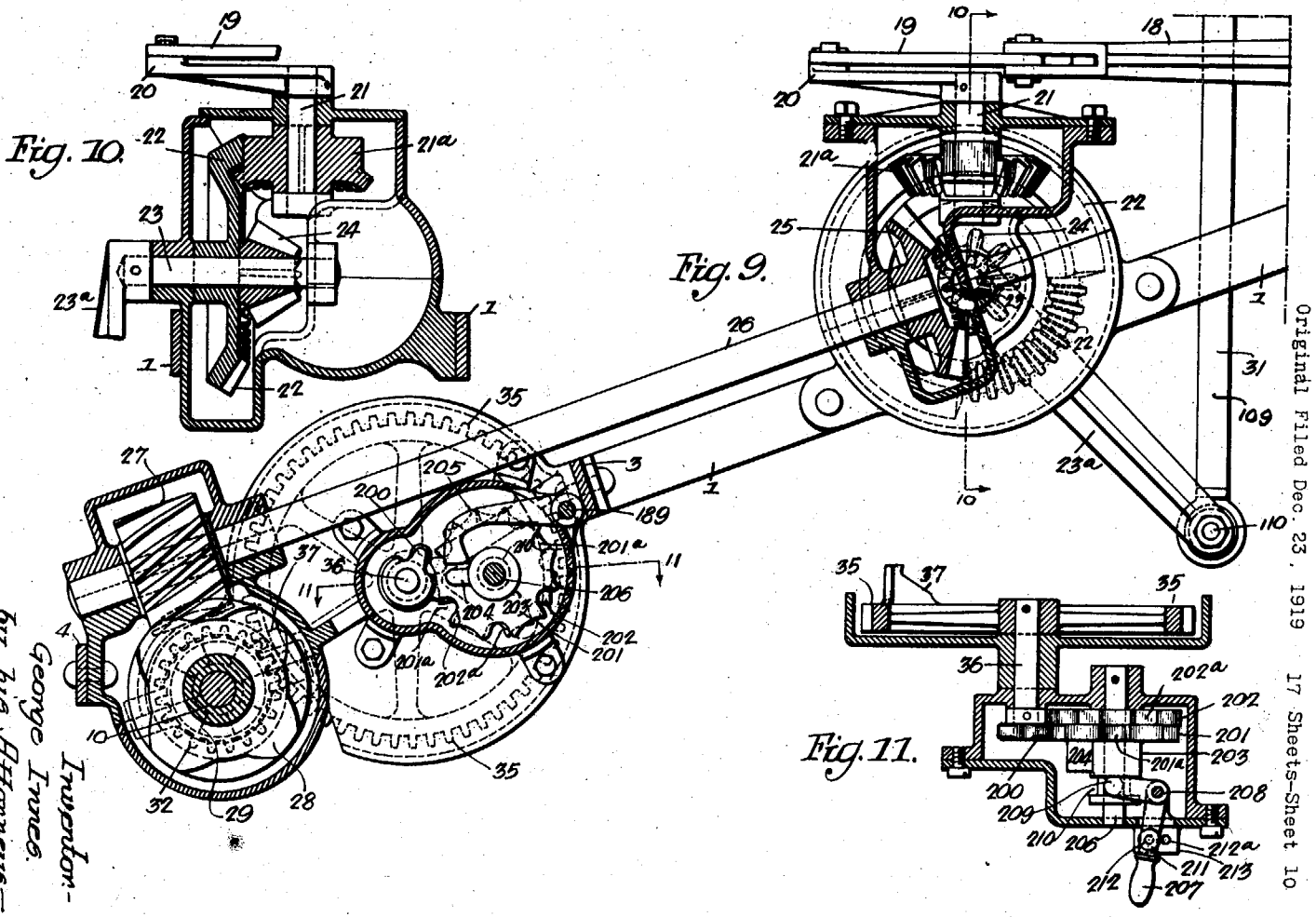

Fig. 9 is a longitudinal sectional view of a portion of the driving mechanism on the line 9—9, Fig. 4, and illustrating means for operating the boom.

Fig. 10 is a section on the line 10—10, Fig. 9.

Fig. 11 is a sectional view on the line 11—11, Fig. 9.

Figure 12:
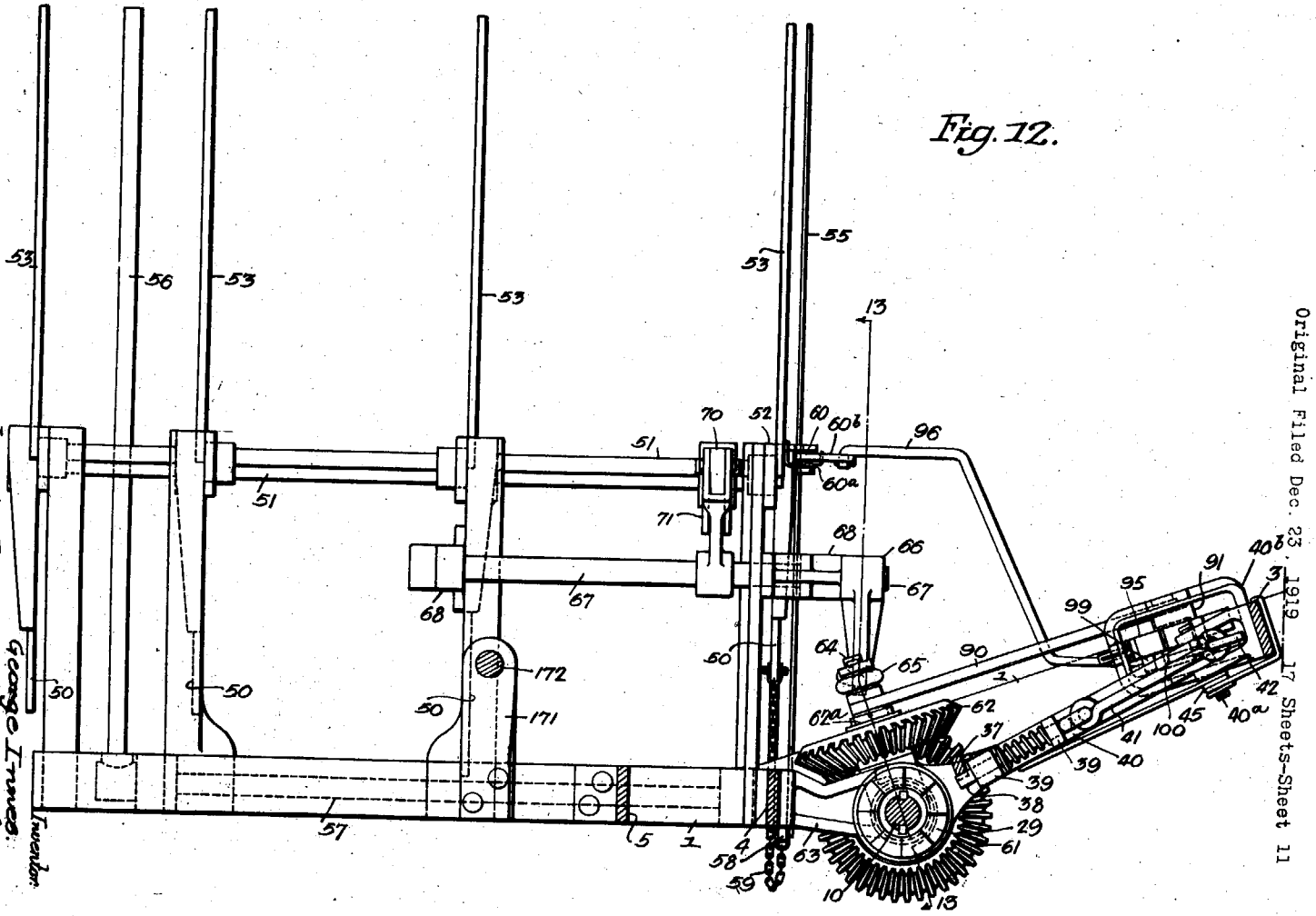

Fig. 12 is a section on the line 12—12, Fig. 4, illustrating the cradle and a part of the mechanism for operating the same.

Figure 13:
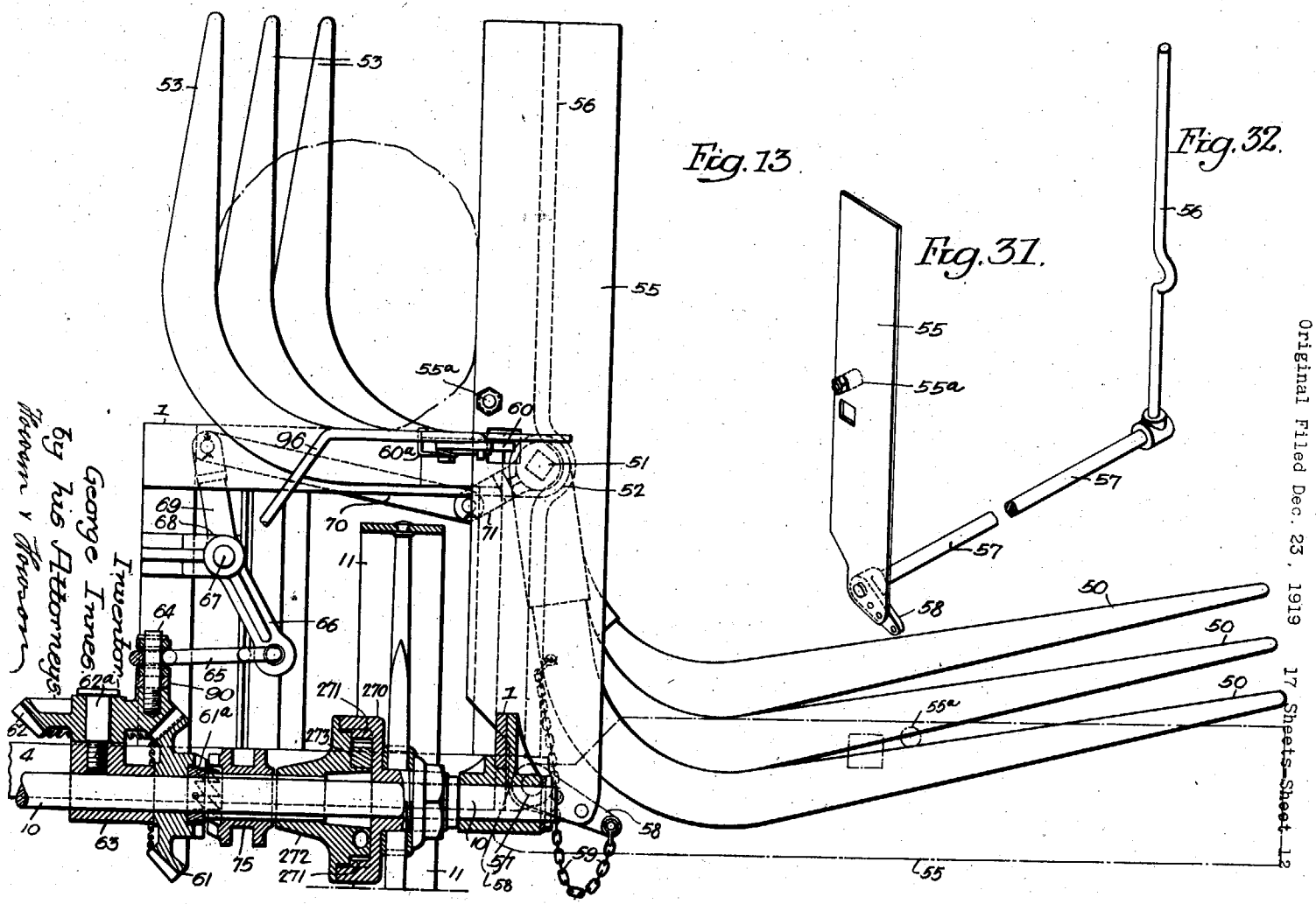

Fig. 13 is an enlarged end elevation of the cradle on the line 13—13, Fig. 12.

Figure 14:
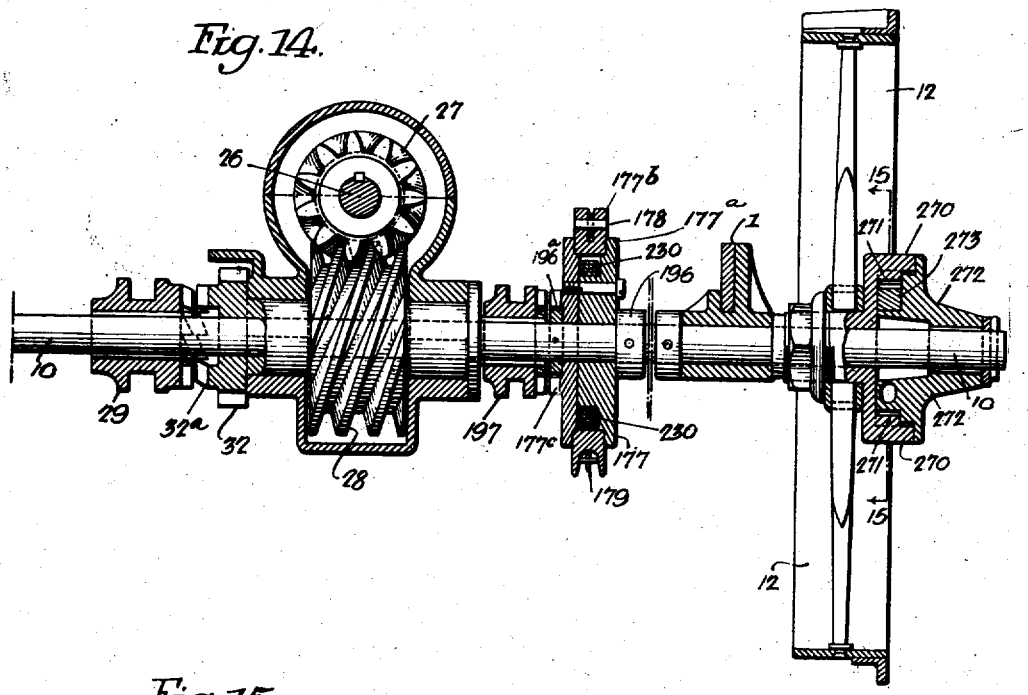

Fig. 14 is a sectional view illustrating one end of the driving shaft, and the mechanism thereon, the section being on the line 14—14, Fig. 4.

Figure 15:
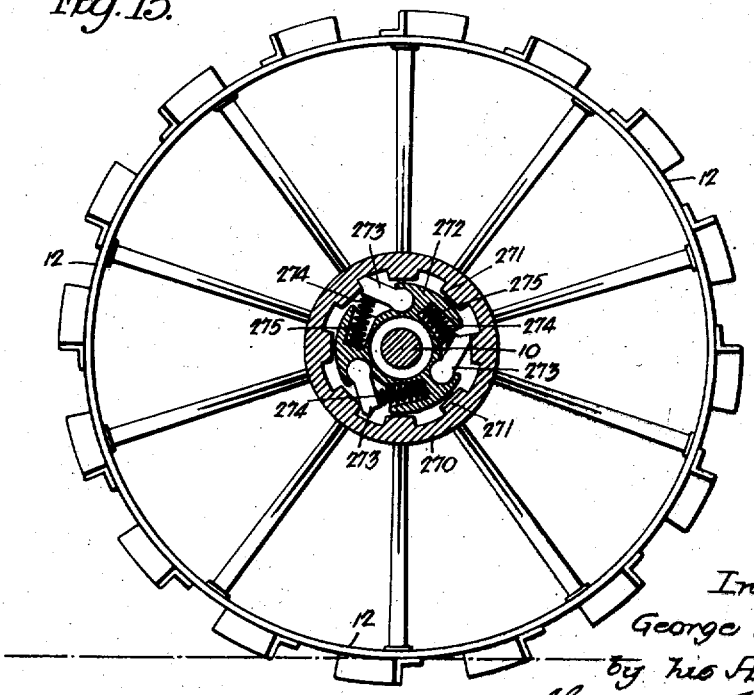

Fig. 15 is a sectional view on the line 15—15, Fig. 14.

Figure 16:
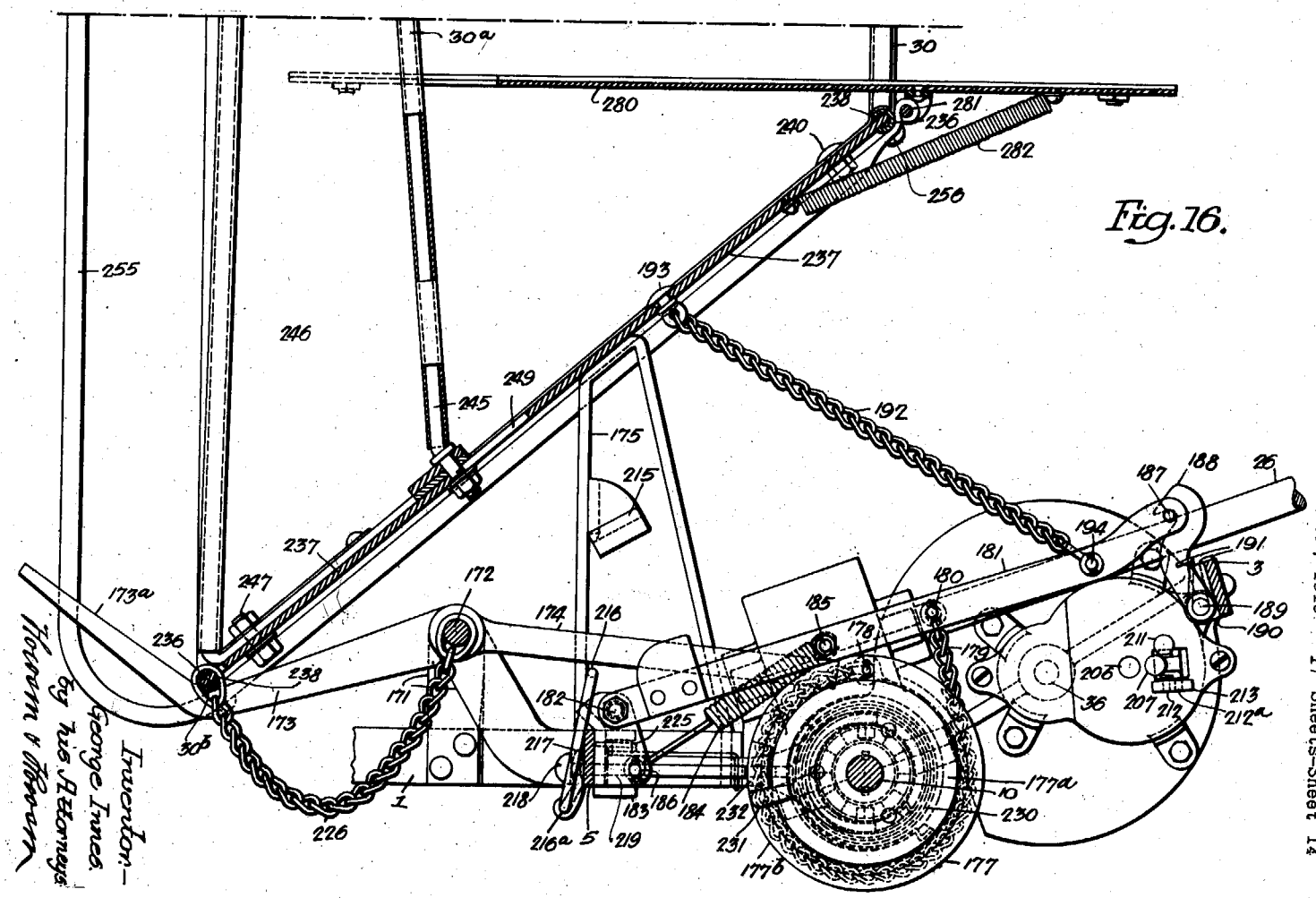

Fig. 16 is a longitudinal sectional view through the basket on the line 16—16, Fig. 4, and illustrating mechanism for operating same.

Fig. 17 is a view illustrating detail of the invention drawn on the line 17—17, Fig. 4.

Figure 1:
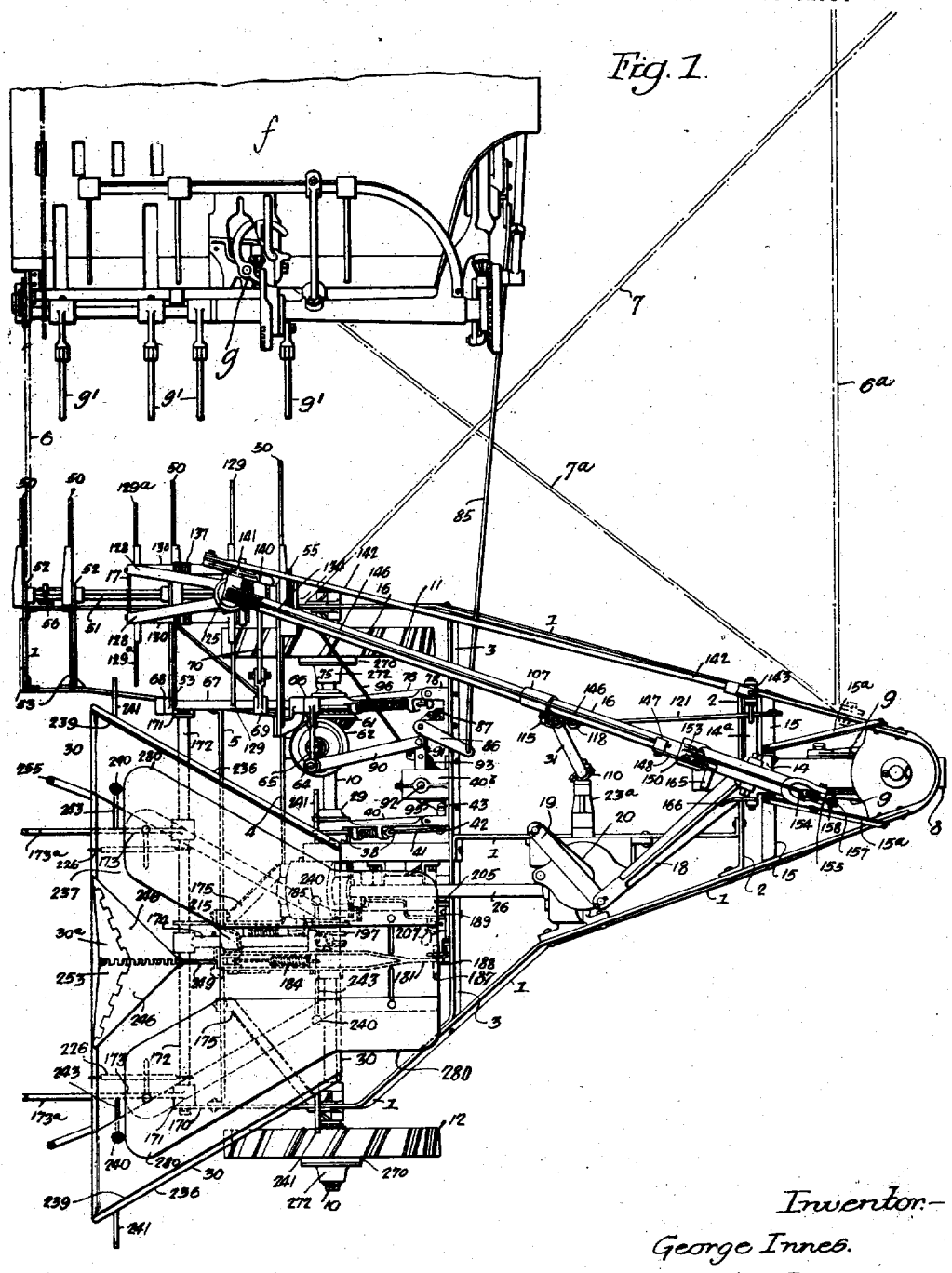
Fig. 1 is a plan view of my improved grain shocker.
Figures 2, 18, 19:
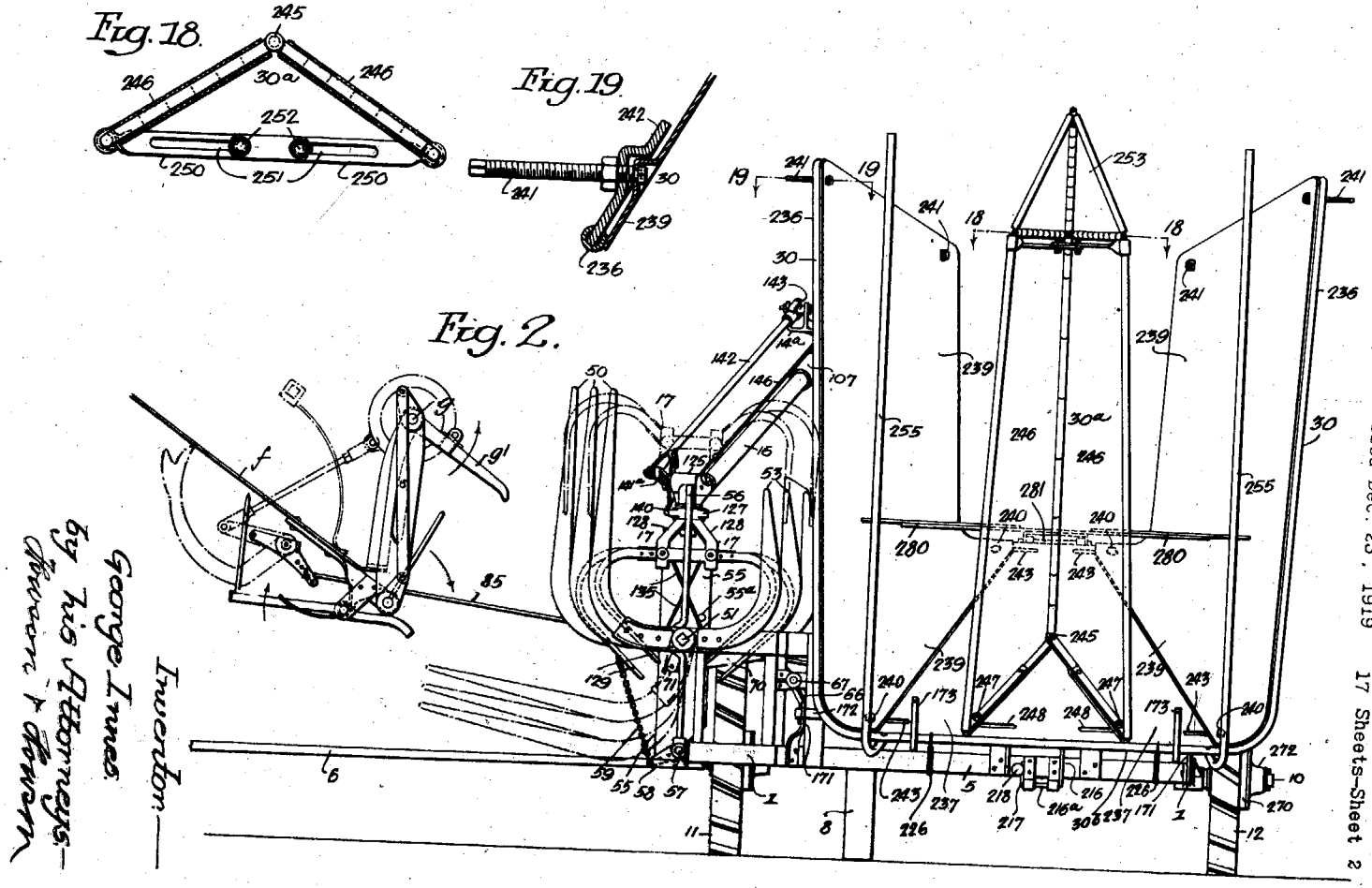
Fig. 2 is a rear elevation of the shocker with the basket in an elevated position.

Fig. 18 is a sectional view on the line 18—18, Fig. 2.

Fig. 19 is a sectional view on the line 19—19, Fig. 2.

Figure 20:
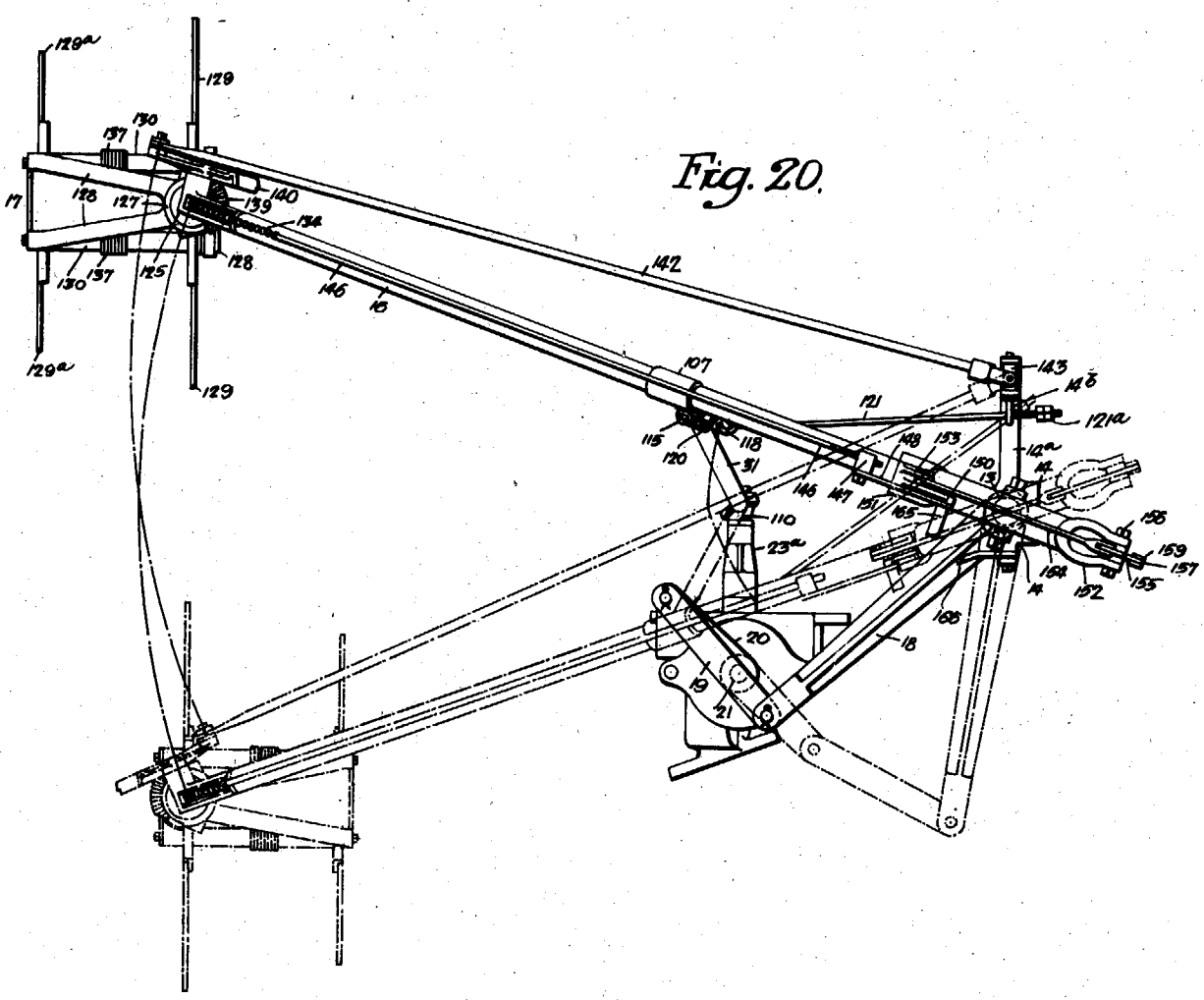

Fig. 20 is a plan view showing the boom with the gripping mechanism thereon, in full lines in one position and dotted lines in the other position.

Figs. 21 and 22 are views of the gear wheels at the side of the gripping mechanism.

Figs. 23, 24 and 25 are views illustrating means for holding the bundles in the basket as it is being tilted to discharge its load.

Figs. 26, 27, 28 and 29 are detached views illustrating mechanisms shown in Figs. 4 and 4[a].

Fig. 30 is a detached perspective view of the boom hook and its carrier.

Fig. 31 is a detached perspective view of the divider board.

Fig. 32 is a detached perspective view of the divider arm.

Figure 33:
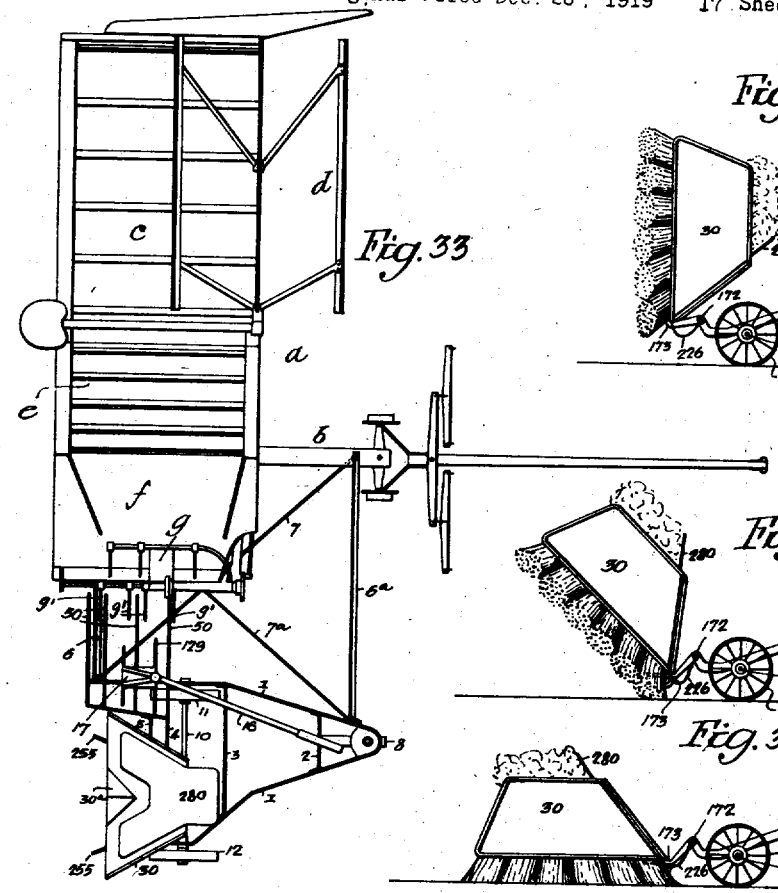
Figure 34:
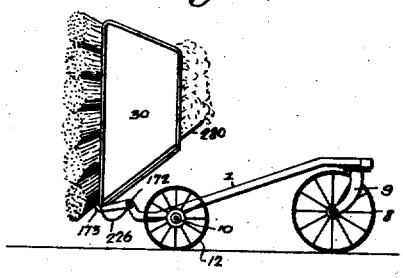
Figure 35:
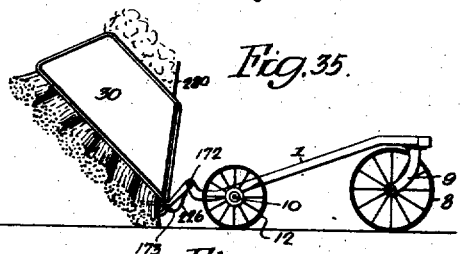
Figure 36:
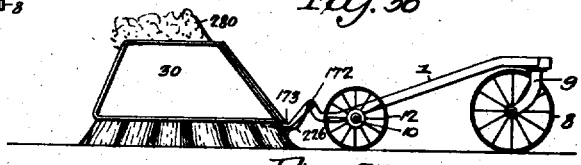
Figure 37:
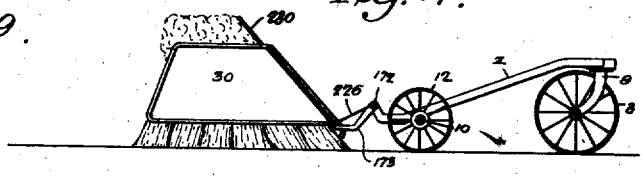

Fig. 33 is a plan view showing my improved shocker connected to a reaper and binder.

Figure 39:
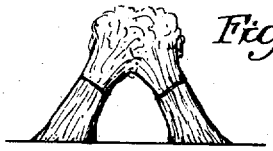
Figure 38:
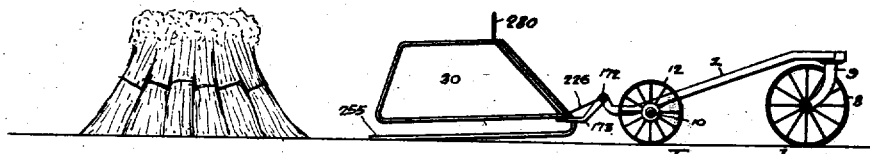

Figs. 34 to 38 inclusive are diagrams illustrating the operation of the mechanism to discharge the basket with its load, and Fig. 39 is an end view of a shock, showing the two rows of bundles with space between them.

1 is the frame of the machine in the present instance having cross braces 2, 3, 4, and 5, which serve to support various parts of the operating machine. The machine is connected to the binder by suitable bars 6 and 6[a], and 7 and 7[a]; the latter extending diagonally from the front of the shocker machine to the front of the binder frame, and the former from the rear corner of the shocker machine to the forward portion of the binder draft means. The forward portion of the shocker frame is supported by a wheel 8, carried by a swivel arm 9, pivotally mounted in a bearing forming part of the frame 1.

10 is an axle mounted in the bearings on the frame and on the axle are wheels 11 and 12, and movement of this axle 10 through the medium of suitable gearing, clutches and other mechanism, effects operation of the various parts of the shocker structure.

At the forward end of the frame 1, I mount a vertical mast 13, which may be stepped in a bearing 13[a] carried by the cross brace 2, and supported at its upper end by a bearing 14 mounted on a standard 15 and braces 15[a]. At the upper end of the mast 13 is pivoted a boom 16, said boom carrying at its outer end a set of gripping fingers, indicated at 17, and more fully described hereinafter. The mast can turn on its pivot and the boom can be raised and lowered. The mast 13 is provided at its lower end with an arm 18 connected by a link 19 to a crank arm 20, carried by a vertical shaft 21, having a broken gear 21[a] meshing with a broken gear 22, fast to a horizontal shaft 23; on which is a bevel pinion 24, meshing with a bevel gear wheel 25, on the end of a longitudinal shaft 26, which has a worm wheel 27 at its opposite end driven by a worm 28 loose on the shaft 10, and operatively connected therewith by a clutch 29. By the means just described, the mast 13 is given a horizontal movement to the extent of approximately a quarter circle for the purpose of effecting movement of the boom 16 whereby the latter may be placed in position to enable the gripping fingers to pick up bundles from the cradle of the shocker when in one extreme position, and to deliver said bundles to the shock-forming basket 30 when in the other extreme position as shown in Fig. 20.

Additionally, in moving from side to side of the machine, the boom is raised and lowered, and this may be accomplished by means of a crank 23[a] carried by the shaft 23; a telescopic rod 31, being more particularly described hereinafter, operatively connecting said crank with the boom.

In the present instance a pinion 32 is formed on the hub of the worm 28, and this pinion has a clutch face 32[a] for engagement by the clutch 29 splined to the axle 10 so that when the clutch is in operative engagement with the pinion, the shaft 26 and the mechanism effecting operation of the boom can be operated. The pinion 32 meshes with a gear wheel 35, mounted on a shaft 36, and said wheel 35 carries on its face a wedge-shaped cam 37, adapted to coact with a sliding rod 38, and release the clutch 29 at the end of each complete revolution of the gear wheel 35, which is in timed relation to the operation of the boom so as to allow it to make one complete movement from the dwell position above the cradle and return. This interval approximates two and three-quarter revolutions of the shaft 10.

The rod 38 is suitably guided in apertured lugs 39, carried by a clutch lever 40, which is pivoted at 40[a] to a bracket 40[b] carried by the cross brace 3. A link 41 carried by the rod 38 extends forwardly into operative engagement with the arm 42 of a bell-crank lever pivoted at 43 to the bracket 40[b]. Action of the cam 37 operating upon the rod 38 moves it laterally, together wtih the clutch lever 40, so as to disengage said clutch 29 from the pinion 32. The parts are held until the bell crank lever is again actuated to withdraw the rod 38 out of the path of the cam 37. After the cam has been released by the rod 38, a torsion spring 45 carried by the pivot pin 40[a] of the clutch lever 40 throws the same into action again.

The bundles of grain are delivered from the binder delivery platform to a cradle formed of movable arms 50 and fixed arms 53. The arms 50 are secured to a rock shaft 51, journaled in suitable bearings 52, carried by a suitable supporting part of the framework of the shocker structure. Additionally, a series of fixed arms 53 project upwardly from a portion of the shocker structure which may be termed the table, and the initial position of these several arms is illustrated in Fig. 13.

The arms 50 of the cradle receive the first bundle, and by the operation of suitable mechanism to be later described, lift the same to the position illustrated by dotted lines in said figure, when the gripper is in the position of rest, shown by broken lines, Fig. 2. In addition to the arms 50, I provide a divider board 55, and a divider finger 56. The divider board 55 is secured to an arm 58 on a shaft 57 and the finger is secured directly to the shaft 57. The arm 58 is connected by a chain 59 with one of the arms 50 so that when the latter assume the raised position, as illustrated by the full lines, Fig. 2, the shaft 57 will be turned and the divider board and divider finger will be quickly lifted from the position shown by broken lines in Fig. 13 to the vertical position illustrated in full lines in said figure, and locked in such position by a latch 60. When the divider board is in the position shown by broken lines, a pin $55^a$ on the board rests upon the lowermost arm 50.

After the first bundle has been raised to position and the divider board and divider finger have been brought into engagement with the same, the arms 50 must be dropped to pick up the second bundle; the divider board and divider finger remaining in position to hold the first bundle in place, and when the fingers 50 have lifted the second bundle, the gripper is ready to pick up the pair of bundles; having descended from the position shown in broken lines to the position shown in full lines, Fig. 2, and by the mechanism described, it may be raised and swung over to deposit said bundles in the basket; the gripper reversing during this operation.

Loose on the axle 10 between a bracket 63 on the cross bar 4 and a collar $61^a$ is a bevel pinion 61 meshing with a bevel gear wheel 62 mounted on a stud $62^a$ carried by the bracket 63. The bevel gear wheel 62 carries a crank pin 64 connected by a link 65 to an arm 66, on the end of a rock shaft 67, journaled in suitable bearings 68 on the main frame. The rock shaft 67 also carries an arm 69, connected by a link 70, to an arm 71, carried by the rod or shaft 51 forming the pivotal support for the arms 50.

The pinion 61 is loose on the shaft 10 and may be brought into operative engagement therewith by means of a clutch sleeve 75, operated by a clutch lever 76, pivoted at 77, to a bracket 78 on the cross bar 3. The lever is provided with guide lugs 79 for a rod 80, having a head 81; the opposite end of said rod lying in position to be engaged by a cam 82 on the back of the pinion 61.

The rod 80 controls the operation of the clutch lever and the pinion 61. Each time a bundle is tied and delivered by the binder to the arms 50, the link 85 is actuated—being pushed in the direction of the arrow "*x*". This link is operatively connected to a moving element of the binder and to an arm 86 on a short shaft having a second arm 87 disposed in position to engage the head 81 of the rod 80 when the link 85 is operated, and this action removes the end of said rod 80 from the cam 82 on the pinion 61; permitting the clutch 75 to engage said pinion; said clutch being moved to such position by a torsion spring 88. When the link 85 is moved to its fullest extent in the direction of the arrow "*x*", it first raises and then releases the rod 80, the latter being then carried again into the path of the cam 82 by means of a spring 89 so as again to disconnect the clutch 75 after the pinion 61 completes one revolution. The movement of the link 85 is such that the arm 87 will not only pull the rod 80 free from engagement with the cam 82, but will pass beyond the head 81 thereof so that the spring 89 can act to move the opposite end of said rod 80 as above described. When the cranks 86 and 87 return to the position shown in Fig. $4^a$, the latter must pass the head 81 of the rod 80, and to permit this, the latter has a pivoted end $87^a$; a spring $87^b$ being employed to hold said end in the active position.

The crank pin 64 on the pinion 62 is connected by a link 90 with a bar 91 pivoted at 92 to the bracket $40^b$ carried by the cross bar 3. The bar 91 carries a pawl 93 adapted for engagement with ratchet wheel 95, also pivoted on the axis 92; such pawl racking the wheel one tooth for every rotation of the bevel gear wheel 62, which represents the deposit of one bundle on the arms 50.

After the divider board 55 has been lifted to the position shown in Fig. 13, to separate a pair of bundles, it remains in such position until said bundles have been picked up by the gripper and delivered to the basket; being held in such position by a latch 60, which may be retained by a spring $60^a$. After such action, it is necessary to drop the divider board 55 and the divider finger 56 for proper operation in connection with the next pair of bundles, and the latch 60 must be released. For this purpose, the arm $60^b$ of the same is connected by a link 96, with a bell-crank lever 97, pivoted at 98 to the bracket $40^b$, and having an end in position to be engaged by pins 99 carried by the ratchet wheel 95. The timing is such that the latch will only be operated after the second operation of the arms 50.

The bell-crank lever pivoted at 43 is also actuated by the pins 99 of the wheel 95; the same engaging a projection 100 on the arm $42^a$ of said lever; the end 42 of the same being connected by the link 41 to the rod 38 and operating to free the same from the cam projection 37 on the face of the gear wheel 35. It will be noted that the clutch 29 is thrown in by means of the torsion spring 45.

The boom 16 carrying the gripping mechanism is pivoted at the upper end of the mast 13. Its forward end is connected by means of a spring 105 with a bracket 106 carried by the mast 13. Carried by the boom approximately midway between the ends of the same is a bracket 107, to which is pivotally connected the telescopic rod 31, which comprises in the present instance an inner section 108 telescopically fitting the hollow outer section 109. The lower end of this rod 31 is connected by a ball and socket point 110, shown in detail Fig. 17, to the crank arm 23[a] carried by the shaft 23, and given an intermittent movement thereby by reason of the broken gears 21[a], 22 and the bevel gears 24 and 25.

The bracket 107 may be secured to the boom 16 by a pin 111, and this bracket has ears 112, in which is secured a pin 113, upon which a block 114 is journaled; the latter having side studs 115 to which the arms of a yoke 116 are pivotally connected; such yoke being secured to the upper end of the rod 108. Also pivoted on the studs 115 is a hook 118, which is adapted to engage a collar 119 carried at the upper end of the sleeve 109, as clearly shown in Fig. 8. The hook is arranged to normally lie in engagement with said collar under the influence of a spring 120, looped around the studs upon which the forked end 117 of the hook 118 is journaled. The hook is connected by means of a rod 121 with an arm 14[a] on the bearing 14. The rod passes through an eye 14[b], Fig. 4[b], on the arm and has nuts 121[a] thereon for adjustment.

As the eye 14[b] is on the cradle side of the mast 13 the hook 118 will remain in engagement with the collar 119 until the boom swings over the centre and to a position above the basket, and as the boom nears the position above the basket the hook 118 is withdrawn from the collar 119 and the boom released from the control of the arm 23[a].

When the boom is over the cradle or in the dwell position the telescopic rod 31 is connected to the collar 119 by the hook 118 and as the rod 31 is drawn down by the crank 23[a] it pulls the boom down with it and carries the gripping head into position to engage the two bundles within the cradle.

At the end of the boom 16 is a head 125 which carries the gripping mechanism for the bundles.

On the head is a hollow stud 126 upon which is a hub 127 held in place by a collar 136, but free to turn on the stud. The hub has arms 128 forming bearings for two shafts 130. On each end of each shaft are fingers 129—129[a], the fingers 129 being spaced a greater distance apart than the fingers 129[a]. In the present instance the shafts 130 are hollow and are closed at each end, and stud bolts 131 extend through the frames and into the ends of the shafts.

The gripping fingers 129—129[a] are shaped as shown in Fig. 7 so as to engage the two bundles which have been arranged in the cradle with the heads of the grain together and the butts separated, and spring fingers 135 hold the bundles in the curved portions of the fingers 129 as shown in Fig. 3 so that they can be transferred and turned end for end without the liability of falling from the gripping head and so that they may be placed in the basket in the same relation to each other that they were in the cradle.

The spring fingers 135 are carried by the two shafts 130 in a line with the fingers 129. These fingers extend down between the two fingers 129 and yieldingly hold the bundles in the curved portions of the fingers.

The hub 127 is free to rotate on the stud under control of gearing so that the bundles of grain can be turned end for end when being transferred from the cradle to the basket.

The gripping fingers 129 are normally held in the open position by springs 137 coiled around the shafts 130, one end of each spring being secured to its shaft while the other end engages a bar on the arm 128 carrying the shaft. Mounted on a stud 141 projecting from the head 125 is a segmental bevel gear 140 which meshes with a segmental bevel pinion 139 formed on the hub 127. The bevel gear 140 has flat surfaces 140[a] and 140[b] which slide in contact respectively with the flat surfaces 139[a] and 139[b] on the hub 127 locking the hub, and the gripping mechanism carried thereby, in its two extreme positions above the cradle and above the basket.

The segmental gear 140 is operated by a rod 142 connected to an arm 141[a] on the gear and this rod is connected to the universal joint 143 on the arm 14[a].

The universal joint is on the same side of the mast 13 as the eye 14[b] and consequently the segmental gear 140 will be turned as the boom is shifted from one position to the other and the hub with the gripping mechanism will consequently turn. The gears are so proportioned that the gripping mechanism will turn one half a revolution and the bundles of grain carried thereby will be turned end for end.

In order to operate the gripping fingers to engage the bundles, I form extensions 132 on the fingers beyond their pivots on the shafts 130 and these extensions are connected to a chain 134 by links 133 as shown in Fig. 7. The chain passes through the head and around a wheel 145 mounted on the head and is connected to a rod 146 which is attached to a swivel head 147 on one end of a link 148 attached at 149 to an arm of a bell crank lever 150, pivoted at 151 to the pivot member 152 of the boom 16. The link 148 is bent as shown in Fig. 8 to pass clear of the bearing.

A short arm 153 of the bell-crank lever 150 is connected by a link 154, to the long arm of a second bell-crank lever 155 pivoted at 156 to said pivot member 152. The short arm 157 of this bell-crank lever 155 is connected at 158 to a rod 159, which has at its lower end a section of chain 160, connected to an adjustable eye-bolt 161 carried by the bracket 106 on the mast 13.

As this rod 159 controls the closing of the gripping fingers around the bundles preparatory to lifting them from the cradle, it is essential that means be provided to adjust the length of the same with respect to the bracket 106, and for this purpose the lower end carries the flexible chain which is in turn connected to the adjustable bolt 161. Upon the downward movement of the boom carrying the grapple structure from the position shown in broken lines Fig. 2 to the position shown in full lines in said figure, this rod will actuate the bell-crank lever 155.

The boom is lifted by means of the telescopic rod 31 receiving motion from the crank arm 23ª on the end of the shaft 23, and in Figs. 3 and 8, the boom is shown in the extreme elevated position, midway between picking up the bundles and delivery of the same to the basket. It will be readily understood the boom is partly counterbalanced by the spring 105, but is of such weight that with the grapple at the end of the same, it may be lowered to the dwell position by movement of the crank arm 23ª on the end of the shaft 23.

The inner section 108 of the telescopic rod is pivotally connected to the bracket 107. The section has a substantially universal connection with the bracket 107 so as to follow the latter in its various movements. When the boom is moving to the dwell position, the collar 119 on the end of the outer section 109 comes into position to be engaged by the hook 118 pivoted to the bracket 107. The hook 118 is spring-supported, and the collar 119 is capable of pushing the hook out of the way in rising to make the connection. In this relation, further downward movement of the crank 23ª on the shaft 23 will cause the rod 31 to lower the boom until the grappling fingers are in position directly over the bundles to be lifted. At this moment, the connection between the bell-crank lever 155 and the bracket 106, has been rendered taut, and acting through the bell-crank levers 155 and 150, has moved the rod 146, pulling the chain 134 through the hollow head 125, and closing the grappling fingers 129 and 129ª around a pair of the bundles.

In this action, the cranked link 148 is thrown over to the position shown in Fig. 8, passing below the center 151, thereby locking the gripping fingers in the gripping position until the bundles have been brought to a position over the basket ready to be deposited therein. In this movement of the boom, the bundles have been turned end for end so that they will be dropped in proper position with reference to the shock to be formed in the basket. When the boom reaches the delivery position, a projection 165 on the crank 150 comes into engagement with an arm 166 carried by the bearing 14, the effect of which is to lift the cranked link 148, raising the bell-crank lever 150 out of its locked position to the position shown by broken lines, Fig. 8, permitting the springs 137 to open the gripping fingers 129 and 129ª, and releasing the bundles which fall into the basket.

In depositing the bundles in the basket, the angle of the boom with respect to the rod 121 is such that the collar 119 will be released from the hook 118 at a relatively definite point, insuring the dropping of the bundles into the basket in proper relative position, and this position is maintained through the operation of the machine and when the bundles reach a given height in the basket the whipping action due to the release of the bundles will tend to pack the bundles in the basket.

The means for carrying and operating the basket are as follows: The side portions of the frame 1 are extended, as indicated at 170, and support upwardly disposed brackets 171, in which is journaled a rock shaft 172, on which are rearwardly extending arms 173, and a forwardly projecting arm 174; such parts being shown with the basket in the elevated position in Figs. 3 and 16.

The basket rests, as shown in Fig. 16, upon the arms 173 and on upwardly extending supports 175, when in the bundle-receiving position.

Mounted on the axle 10, is a sheave 177, to which is connected at 178, a chain 179; the opposite end of said chain being attached at 180 to a bar 181 pivoted at 182 to a bracket 183 carried by the cross bar 5 of the frame of the machine. Additionally, a spring 184 is connected to the bar 181 at the point 185, and to the bracket 183 at the point 186. This spring partly counterbalances the weight of the basket when it is moved to and from the discharging position. The forward end of the bar 181 is provided with a projection 187 for engagement by a hook 188 mounted on a shaft 189 carried by a bracket 190 mounted on the cross bar 3; said hook 188 being held in engagement with the projection by a spring 191. A chain 192 is connected to the basket at 193, and to the bar 181 at 194.

Normally the sheave 177 is out of operative engagement with the axle 10, being loose on said axle and rotating between a pair of collars 196 and 196ª. In order to raise the basket to the elevated position shown in Figs. 3 and 16, I provide the axle 10 with a clutch member 197, Fig. 14, adapted for engagement with the clutch face 177ᶜ of said sheave, and said clutch may be brought into action in the following manner:

As hereinabove described, the basket is of such a size as to be capable of receiving a given number of bundles to form a shock, two bundles being placed in the basket at one time and as these bundles are held by the gripper at an angle one to the other, they will pass on the opposite sides of a central partition 30[a], of the basket, when discharged from the gripper. As each pair of bundles is delivered, the shaft 36 is rotated, and this shaft carries the single tooth 200 of a Geneva movement, Figs. 9 and 11, which actuates one of the star wheels 201 or 202. Preferably I provide two star wheels, 201 and 202; the former having six recesses 201[a] for engagement by the single tooth 200, and the latter having seven recesses 202[a] for engagement by said single tooth 200. Additionally, the hub 203 carrying said pinions is provided with a projection 204 for engagement by a tripping pawl 205 carried on the end of the shaft 189; the opposite end of which carries the hook 188 which normally retains the bar 181 with the basket in the elevated position. The wheels 201 and 202 are longitudinally movable on their shaft 206 so that either one may be brought into line with respect to the single tooth 200, and when one wheel has been moved six spaces, (or a complete revolution) or the other wheel has been moved seven spaces, (or a complete revolution) depending whether the machine is set for the shock-forming basket to receive twelve or fourteen bundles, said projection 204 will be brought into engagement with said tripping pawl and disengage the hook 188.

The change in the Geneva gearing may only be effected when the basket is on the ground after a shock has been delivered, and it may be effected by means of a suitable lever 207 pivoted at 208 to the housing for said gearing, and carrying an arm 209 in operative engagement with a groove 210 in the hub 203. In order that the lever 207 may be locked in the respective positions, I may provide a pin 211, adapted to engage recesses 212 or 212[a], of a projection 213 carried by the housing.

Pivotally mounted at 281 at the forward end of the basket is a platform 280, which extends beyond the end of the basket so as to support the heads of the grain. This platform is bifurcated and extends into each section of the basket, and is held in a horizontal position by a spring 282, which yields when the first pair of bundles is placed in the basket. The object of this platform is to insure the positioning of the bundles in the basket, preventing the bundles reversing themselves when dropped by the gripper as, in some instances, the heads of the grain are so heavy that they have a tendency to drop in advance of the butts and enter the basket in a reverse position. By providing the platform 280, the grain is dropped onto this platform and the platform tilts, insuring the butts of the bundles being located in the proper position. It also prevents the heads of the grain hanging over the front edge of the basket.

When the bar 181 is released to discharge the basket it moves on its pivot 182, and releases the arm 174, which follows around underneath the pivotal connection 185 of the spring 184 by the weight of the basket on the arms 173 until it reaches a stop 215, carried by one of the upwardly projecting members 175. When the arm 174 is in this position, the arms 173 will have turned until the portion 173[a] is substantially horizontal. The edge 30[b] of the basket meanwhile lies in the crotch of said arms 173; and when the basket has fallen with the butts of the bundles resting on the ground, the portions of the arms 173 are drawn from beneath the basket while the latter remains for a brief period at rest so that the bundles can settle in firm contact with the stubble, the edge of the basket resting on the outer ends 173[a] of the arms.

As the arm 181 swings to the extreme rearward position, it trips a lever 216 pivoted at 216[a], said lever being cranked and having an end 217, which engages the head 218 of a rod 219, on a clutch lever 222, Fig. 4, moving the same against the tension of a spring 220, thereby withdrawing the end of said rod from engagement with a catch 221 releasing the clutch lever 222, which is pivoted at 223 and which forces the clutch 197 into engagement with the clutch face 177[c] on the sheave 177, under the influence of a spring 225.

Chains 226 are attached to the lower edge of the basket and to the rock shaft 172 in the present instance and these chains are slack when the basket is in the receiving position as shown in Fig. 16, so that when the basket is released and reaches the depositing position in contact with the ground, the machine is free to move forward to the extent of the length of the chain connection, momentarily permitting the basket to rest at the ground without movement, thereby allowing the ends of the bundles forming the shock to contact directly with the stubble, and insuring such an anchorage as will permit the basket to be subsequently drawn away from the bundles forming the shock without disturbing the position of the bundles in the shock.

The sheave 177 on the axle 10—Fig. 14—has a body section 177[a] carrying the clutching face, and a grooved rim section 177[b] to which the chain 179 is attached. A coiled spring 230 is connected to the two sections and is designed to permit movement of the axle, independent of the rim section and the chain 179 during the time that the basket remains quiescent for proper placement of the shock and while the basket is being withdrawn from the same; such movement occupying a space of time approximately sufficient for one full revolution of the axle 10. At the beginning of this movement, a projection 231 on the body section 177[a] of the sheave is in advance of another projection 232 on the rim section 177[b], and said body portion 177[a] makes substantially a complete revolution until its projection 231 is brought into operative engagement with the projection 232, whereupon the sheave may move as a whole. During this time, the basket has been pulled away from the shock, and when the sheave moves as a whole, it winds the chain 179 thereon, which in turn pulls down on the bar 181 until its end is caught by the catch 188; the basket meanwhile traveling forward along the rear portion 173[a] of the cranked arms 173 and being raised to the bundle-receiving position by the pin 185 on the bar 181 coming in contact with the arm 174. When the bar 181 has been caught by the catch 188, the clutch 197, which operatively connects the axle 10 with the sheave 177, is thrown out of action by a cam 233 on the side of the rim section of the sheave; the latter engaging a projection 234 on the clutch lever 222.

The basket 30 is preferably of a character permitting adjustment as to size, more particularly for bundles of grain of different length. It will be understood, that if the grain is short, the shock will have a smaller base, and that under such condition it is preferable to have a basket of a size to receive twelve or fourteen bundles, as the case may be, that will keep the sides of the shock at the same angle.

The basket comprises a frame 236, which may be of suitable tubing of the proper size, and this frame is continuous along the bottom edge of the sides and front end of the basket when the latter is in the ground-engaging position, and substantially vertical at the rear edge of the sides of the basket, and along the top edge of the sides and front end of the same, and such frame, while it may be made of sections, is preferably connected together so as to be one continuous piece. The bottom 237 of the basket when the latter is elevated, is made of sheet metal and the opposite edges extend into slots 238 formed in the tubular frame.

The sides 239 of the basket, which are of the special shape clearly illustrated in Figs. 2 and 3, are located on the inside of the frame, and overlap the section 237 being secured to the several parts by means of bolts 240 and 241. The bolts 241 are attached to corner members 242 carried by the frame. The section 237 is slotted at 243 to permit movement of the sides 239 with respect thereto. Additionally, the partition 30[a] must be adjustable and this partition consists of two side members 246 connected to a central bar 245 by hinge joints, said sides being connected to the bottom section 237 by bolts 247 adapted to move in slots 248 in said section; the rod 245 being also adjustably mounted in said bottom section 237; being adapted to move in a slot 249 in the same, Fig. 16. The upper end of the partitions must also be capable of collapsing, and for this purpose the sides are connected by adjustable bars 250, Fig. 18, slotted at 251 and having clamping bolts 252; a substantially wedge-shaped portion 253 beyond the bars 250 being so connected as to spread or contract as may be necessary when the said bars 250 are adjusted.

The basket is provided with suitable runners 255 connected to the frame of the basket at 256 and these runners act as stops for the bundles as they are deposited in the basket, and slide on the ground after the basket has been dropped and while it is being pulled clear of the shock.

The traction wheels 11 and 12 may consist of suitable hubs having metal spokes, metal rims and traction lugs on such rims, and they are loose on the axle 10. Each wheel in the present instance has an enlarged hollow hub 270, having on its inner wall teeth 271. Secured to the axle 10 is a block 272, to which are pivotally connected pawls 273 engaged by springs 274 disposed in sockets 275 formed in said blocks 272 and designed to form a driving connection between the wheels and the axle 10 when the structure is moving forward. The arrangement is such that backward movement of the machine will not effect movement of the shaft, since the pawls will slide past the teeth without engaging the same, and when the machine is turning and one of the wheels, 11 or 12, is idle, the pawls 273 of the same will be moved past the teeth 271.

As shown in the drawings, the hubs are provided with eight teeth, which is not a multiple of the pawls employed. With such arrangement the wheels will pick up the pawls very quickly to effect movement of the shaft. It will be understood, however, that I may provide the hubs with a number of teeth that are a multiple of the pawls employed, so that when the wheels are in the shaft-moving position, all of the pawls will be in engagement with teeth.

In Figs. 23, 24 and 25, I have illustrated a device for holding the bundles in the basket while the basket is being tilted into the discharging position so as to prevent the upper bundles from being thrown out of the basket when the basket is turned onto the ground and when a balance spring is not used. This device consists of an arm 283 pivoted to a bracket 284 on one side of the basket and adapted to extend over the top thereof when the last bundle has been placed therein as it moves from the vertical position. This arm 283 is held in the raised position by a spring 285 and when the arm is lowered the spring passes from one side of the pivot to the other so as to hold the arm in its lowered position. The arm 283 is actuated by a lever 286 connected thereto by a rod 287. The lever is engaged by a fixed abutment 288 on the structure. This construction is clearly shown in said figures.

The operation of the shocker is as follows: Referring in the first instance to Fig. 33, *a* is the binder having a beam *b* to which the tongue is secured. *c* is the apron and *d* is the reel. *e* is the inclined apron, which receives the grain from the apron *c* and delivers it to the inclined deck *f*, at which point the knotting mechanism *g* forms the bundles and ties the knot. I make a hinge joint in each arm *g'* so as to allow the fingers to rise without interference.

The frame of my improved shocking device is connected to the binder by the rods 6, 6[a] and diagonal rods 7, 7[a]. The essential parts of the shocker are the cradle, which receives the bundles from the binder, the basket in which the bundles accumulate, and the gripper for transferring the bundles from the cradle to the basket. The mechanism of the machine is operated through the traction wheels when the binder is drawn forward in conjunction with operating means connected to the binder. The apparatus is a continuously moving apparatus and the shock is formed in the basket and is discharged as a unit while the machine is moving forward.

I will now describe the operation of the machine in detail. A bundle of grain is received from the binder by the arms 50 of the cradle and when the arms are raised the divider board 55 and arm 56 are also raised and push the bundle onto the arms 53. As the divider board and arm are retained in the vertical position, the arms 50 are free to return and receive another bundle and are again raised, so that the two bundles are located in the cradle with the divider board and arm between them. The arms 50 and 53 are farther apart at the forward end than at the rear end and the divider board being wide pushes the butts of the bundles apart, while the heads are drawn together and intermesh. The two bundles remain in this position while being carried through the machine and while in the shock.

The gripping mechanism is actuated so as to enter the cradle and grip the bundles and the dividing fingers 135 pass into the space between the bundles and as the gripping fingers close in on the bundles the dividing fingers force the bundles against the gripping fingers. The fingers of the grippers are arranged to hold the bundles in the same angular position as they were in the cradle. Then the gripper is elevated and carries the two bundles over to a position directly above the basket. As the bundles are carried, they are turned end for end, as it will be understood that the heads of the grain face to the rear as the bundles leave the binder and must be turned heads facing forward when discharged into the basket.

At a given time, the grippers release the two bundles and they fall into the basket, one on one side of the partition and the other on the opposite side, falling onto the pivoted platform, which tilts and allows the bundles to assume the proper angle in the basket with the heads uppermost with the butt ends resting against the vertical guards at the rear. This operation is repeated, two bundles being taken over at a time, until a given number has been loaded into the basket according to the timing mechanism. The basket is discharged by the mechanism which automatically actuates the hook that holds the basket in position. The basket will then be allowed to fall from the position illustrated in Fig. 34 to that illustrated in Fig. 36. The butt ends of the bundles forming the shock will assume the proper position on the ground and, due to the slack connection between the basket and the frame, the basket remains momentarily in a stationary position until the shock has settled itself onto the ground, as in Fig. 37. Then the basket is withdrawn from the shock, as in Fig. 38, leaving the shock standing in a firm position with the end bundles at the proper incline in two rows with a ventilating space between them, as in Fig. 39. The basket is then returned by the mechanism to its first position to receive another pair of bundles and the operation is repeated.

By this mechanism, I find that the bundles of grain are carefully handled without shelling to any material extent and the heads of the bundles are so intermeshed that the shock will remain in an upright position under ordinary conditions.

If there is a slight unevenness to the ground, then it may be necessary to add additional bundles to the shock so as to give a greater incline to the end bundles, thereby preventing the shock from falling.

By operating the boom by a worm and worm wheel, the worm acts as a lock for the boom when the clutch is thrown out so that when the boom returns to a position above the cradle, after delivering bundles to the basket, it will be positively held by the worm until the clutch is thrown in to allow it to descend to take up the bundles from the cradle. The dwell of the boom depends upon the time consumed in gathering bundles of a given size.

The several devices of the shocker are driven from the axle, but the clutches through which the devices are driven from the axle, are under control of mechanism connected to the operating mechanism of the binder. In the present instance, the rod is connected to the device that operates the bundling and knotting mechanism.

In the present machine, all of the controlling mechanisms are carried on the frame of the shocker and a simple connection may be made to any binder.

In a companion application, Serial No. 346,843, filed December 23, 1919, I have claimed the basket and the means for operating it.

I claim:

1. The combination in a shocking attachment for a reaper and binder, of a frame; a cradle on the frame of a size to hold two bundles side by side; means for feeding one bundle after another to the cradle; gripping mechanism in timed relation to the cradle mechanism so as to remove two bundles at a time from the cradle; means for turning the gripping mechanism so as to turn the bundles end to end; a basket; means for operating the gripping mechanism to discharge two bundles into the basket; and means for discharging the basket when a certain number of bundles is loaded therein.

2. The combination in a shocking attachment for a reaper and binder, of a frame; a cradle thereon, said crade being shaped to hold two bundles of grain from the binder; means for feeding one bundle after the other to the cradle; means, on the cradle, to separate and hold the two bundles with their heads together and their butts separated; a basket in which the shock is formed; means for transferring two bundles at a time from the cradle to the basket; and means for discharging the basket when a certain number of bundles has been located therein.

3. The combination in a shocking attachment for a reaper and binder, of a frame; a cradle thereon having movable arms and arranged to hold two bundles side by side; means for feeding the bundles from the binder to the cradle one at a time; means extending between the two bundles in the cradle and separating the butts of the bundles, leaving the heads in contact; a basket; means for transferring two bundles at a time from the cradle to the basket; and means for discharging the basket when a certain number of bundles has been placed therein.

4. The combination in a shocker adapted to be connected to a reaper and binder, of a frame; a cradle shaped to hold two bundles side by side; means for feeding the bundles one at a time to the cradle; a divider board in the cradle; means for projecting the board so as to separate the butt ends of the bundles, allowing the heads of the bundles to come in contact; gripping mechanism for engaging two bundles at a time and reversing them; a basket for receiving the bundles; means for operating the gripping mechanism to discharge the bundles into the basket; and means for discharging the bundles from the basket to form a shock.

5. The combination in a shocking attachment for a reaper and binder, of a frame attached to the binder; a cradle consisting of two sets of arms, one of said arms being stationary and the other movable, the cradle being of a size to hold two bundles side by side; means for delivering one bundle at a time from the binder to the cradle; a divider board; a finger arranged to be moved into position between the two bundles located in the cradle so as to separate the butts of the bundles and to allow their heads to come together; a basket in which the shock is formed; a gripper arranged to remove two bundles at a time from the cradle and to hold them in the relative position in which they were in the cradle; and means turning the gripper and the bundles end for end and for carrying them to the basket, said basket being shaped to receive and hold the bundles with their butts separated and their heads together.

6. In a shocking attachment for a reaper and binder, the combination of a cradle shaped to hold two bundles of grain side by side; means for feeding the bundles one at a time to the cradle, said cradle having a set of movable arms arranged at different distances from the center of movement; a divider board having a divider arm arranged to extend up into the cradle and to separate the bundles located therein; a connection between one of the movable arms of the cradle and the divider board and divider arm so that the divider board and arm will be moved into position after the first bundle is located in the cradle; means for holding the divider board and arm while the other bundle is being located; a basket in which the shock is formed; and means for transferring two bundles at a time from the cradle to the basket.

7. The combination in a shocker adapted to be connected to a reaper and binder, of a frame; a cradle mounted thereon having two sets of arms spaced apart so as to hold two bundles of grain side by side, the arms at one end of the cradle being at a greater distance apart than those projecting into the cradle for separating the butt ends of the bundles; a gripping device having fingers for engaging two bundles and holding them in the same relative position in which they were in the cradle; a basket in which the shock is formed; means for turning the gripping device with the bundles; means for carrying the gripping device to a point over the basket; and means for releasing the bundles from the gripping device so as to allow them to be discharged into the basket.

8. The combination in a shocking attachment for a reaper and binder, of a cradle shaped to hold two bundles side by side; means for feeding one bundle at a time to the cradle; a mast; a boom pivoted to the mast; a gripping device on the end of the boom having fingers to engage two bundles in the cradle at a time and to hold them in the same relation in which they were in the cradle; a basket in which the shock is formed; means for moving the boom so as to bring the gripping device and two bundles above the basket; and means for releasing the bundles from the gripping device.

9. The combination in a shocker adapted to be connected to a reaper and binder, of a frame; a cradle mounted on the frame and shaped to hold two bundles side by side; means for delivering one bundle at a time to the cradle; means for separating the butt ends of the bundles in the cradle; a vertically arranged basket having a partition; gripping means for engaging the two bundles in the cradle and lifting them clear thereof, means for turning the bundles end for end when clear of the cradle; means for moving the gripping mechanism with the bundles to a position above the basket; means for operating the grippers to release the bundles so that two bundles at a time will be discharged into the basket from the gripper, one bundle being located on one side of the partition and the other on the opposite side thereof; means for discharging the basket with the shock therein; and means for withdrawing the basket from the shock and returning it to its first position.

10. The combination in a shocker adapted to be attached to a reaper and binder, of a frame; a cradle thereon shaped to hold two bundles of grain; means for feeding one bundle at a time to the cradle; a basket arranged to receive one pair of bundles after another until a given number of bundles has been deposited in the basket; means for gripping two bundles at a time and removing them from the cradle and depositing them in the basket; means for turning the bundles in their passage from the cradle to the basket; a boom carrying the gripping means; a driving shaft; a worm and worm gearing between the said shaft and the boom so as to hold the boom rigidly in the position in which it is stopped in its passage; and means for operating the basket so as to discharge the bundles from the basket onto the ground to form a shock.

11. The combination in a shocker, of a cradle to receive the bundles of grain from a binder; a basket in which the bundles accumulate to form a shock; a boom; gripping means carried by the boom; a positive driving device for raising and lowering the boom; means for detaching said driving device from the boom when it swings over the basket; intermittent mechanism operated by said driving device for shifting the boom laterally; and means for actuating the gripping device to engage the bundles and to release the same.

12. The combination in a shocker, of a cradle to receive the bundles from a binder; a basket in which the bundles accumulate to form a shock; a boom; gripping mechanism carried by the boom; means for operating the gripping mechanism so that it will take up two bundles at a time from the cradle; means for shifting the boom so as to transfer the bundles to a position over the basket; means for raising and lowering the boom; and means for turning the grippers, as the boom is moved laterally, so as to turn the bundles end for end prior to being discharged into the basket.

13. The combination in a shocker, of a cradle to receive the bundles of grain from a binder; a basket into which the bundles of grain are placed; a boom; gripping mechanism carried by the boom; means for operating the boom to transfer the bundles from the cradle to the basket, the gripping device having a segmental pinion with two flat surfaces; a segmental gear meshing with the pinion and having a flat surface at each end to engage the flat surfaces of the pinion; means for actuating the segmental gear when the boom is turned so as to turn the bundles carried by the gripping mechanism end for end as they are moved from the cradle to the basket; the flat surfaces holding the gripping device rigidly to the boom when in its two extreme positions and while the gripping mechanism is operated to engage or release the bundles.

14. The combination in a gripping device for transferring bundles of grain from a cradle to the shock-forming basket of a shocking machine, of a mast; a boom pivotally mounted on the mast; a head mounted on the end of the boom; a hub swiveled to the head and having arms projecting therefrom; two shafts on the arm; fingers projecting from the shafts and arranged to engage the bundles; means for operating the fingers; and means for operating the hub as the boom is moved to or from the cradle.

15. The combination in a gripping device for a shocking machine, of a mast; a boom pivoted to the mast; a head at the end of the boom; a hub pivotally mounted on the head; a frame projecting from the hub; two shafts carried by the frame; fingers on each shaft for engaging and removing two bundles at a time from a cradle, the head being hollow; a chain wheel mounted on the head; a chain passing through the head; an arm on each finger shaft connected to the chain; and means for operating the chain so as to actuate the fingers.

16. The combination in a gripping device for a shocking machine, of a mast; means for turning the mast; a boom pivoted to the mast; means for raising and lowering the boom; a hollow head on the end of the boom; a hub swiveled to the head; a segmental beveled pinion on the hub; a segmental gear meshing with the pinion, the pinion and the gear having flat surfaces at each end so that when the flat surfaces are in alignment the hub is locked to the head; fingers carried by the hub; means for actuating the fingers; and means for actuating the segmental gear wheel on the movement of the boom.

17. The combination in a gripping device for shocking machines, of a mast; a boom pivoted to the mast; a head located at the end of the boom; a hub mounted so as to rotate on the head; a frame secured to the hub; two shafts having fingers mounted on the frame; springs tending to spread the fingers apart; arms on the shaft; a chain secured to the arms and extending through the head; and means for operating the chains to close the fingers on bundles of grain; and means for rotating the hub on the head as it is being moved laterally.

18. The combination in a shocker, of a boom; means for moving the boom; a head on the end of the boom; a hub mounted on the head; means for rotating the hub; a frame secured to the hub; two shafts on the frame; fingers on the shafts; spring means for supporting the fingers; means for closing the fingers onto the bundles; and central spring fingers carried by the shafts and arranged to pass between two bundles and to force the bundles into the carrying fingers.

19. The combination in a grain shocker, of a cradle and a basket; a mast; a boom pivoted to the mast; gripping mechanism on the end of the boom for engaging the bundles in the cradle and transferring them to the basket; a telescopic rod; operating means attached to one section of the rod for reciprocating the same; a latch on the boom engaging a collar on said section; means for releasing the latch located at one side of the pivot of the mast; and means for turning the mast, the parts being so related that when the boom is moved to a position to discharge its load in the basket, the latch will be withdrawn, allowing the boom to rise and return to its first position.

20. The combination in a shocker, of a frame; a shaft operated from a driving axle on the frame; a crank geared to the shaft; a telescopic rod connected to the crank; a mast; a pivoted boom mounted on the mast and pivotally connected to a telescopic rod, one section of the rod having a collar; a latch on the boom engaging the collar; means for releasing the latch when the boom has discharged its load into the basket; a second crank geared to the driven shaft; and an arm on the mast connected to the second crank so that the mast and its boom will be swung laterally in time with the raising and lowering of the boom.

21. The combination in a shocker, of a cradle for receiving bundles of grain from a binder; a basket in which a shock is formed; a mast; means for turning the mast laterally; a boom pivoted to the mast; means for raising and lowering the boom, a gripping device carried by the end of the boom; a lever pivotally mounted on the boom; a rod connected to the lever and to the gripping mechanism; means for actuating the lever when the boom is drawn down into the basket so that the rod will close the fingers of the gripping mechanism around the bundles; and means for releasing the rod when the gripping device is over the basket so as to allow the bundles of grain to fall into the basket.

22. The combination in a shocker, of a cradle; a basket in which the shock is formed; a mast; a boom pivotally mounted on the mast; gripping mechanism carried by the end of the boom; said gripping mechanism having fingers arranged to engage the bundles in the cradle; means for turning the gripping device so that the bundles will be turned end for end; means for causing the fingers to close on the bundles after the boom has been lowered into the cradle; means for releasing the fingers when the boom is over the basket; a telescopic rod connected to the boom; a crank connected to the telescopic rod; an arm on the mast; a crank connected to said arm, each crank having a beveled gear wheel; an axle; and worm gearing between the axle and the beveled gears so that the said gears will be positively driven and will be locked when the worm ceases to rotate.

23. The combination in a shocking machine, of a basket in which a shock is formed; means for receiving grain from a binder; a mast; a boom pivoted to the mast; a gripping device on the end of the boom arranged to engage the bundles and deposit them in the basket; a driven shaft; a beveled gear on the shaft; a short shaft having a beveled pinion meshing with the beveled gear; a crank on the said short shaft; a telescopic rod connecting the crank with the boom; a latch for holding the telescopic sections together; means for releasing the latch at a given point; a segmental gear on the short shaft, said gear having a flat surface; a short vertical shaft having a segmental gear meshing with the first mentioned segmental gear and also having a flat surface, the gears being in such relation that when the two flat surfaces are in contact the short vertical shaft is prevented from rotating; a crank on the short vertical shaft; and an arm on the mast connected to the crank so that the mast will be held stationary at either end of its movement.

24. The combination in a shocker, of a mast; a boom pivoted to the mast; a gripping device on the end of the boom; means for actuating the gripping device to engage and hold the bundles of grain; means for releasing the gripping device when above the basket in which the shock is formed; means for turning the mast and locking it in either of its two extreme positions; means for drawing the boom down so that the fingers will be in position to engage the bundles; and means for releasing the boom so that it can be elevated with the bundles.

25. The combination in a shocker, of a mast; a boom pivotally mounted on the mast; gripping mechanism carried by the boom for engaging and carrying bundles of grain; means for controlling the vertical movement of the boom; a balance spring tending to balance the mast and the gripping mechanism, means for spreading the fingers of the gripping mechanism when the boom is lowered; means for contracting the fingers onto the bundles of grain; means for turning the gripping mechanism with the bundles, end for end; and means for releasing the fingers when the gripping mechanism, with the bundles, is above a basket in which the shock is formed.

26. The combination of a mast; a boom pivoted to the mast; a head on the end of the boom; gripping mechanism carried by the head; a rod for actuating the gripping mechanism; a bell crank lever mounted on the boom connected to the rod; a second bell crank lever at the inner end of the boom beyond the pivot and connected to the first mentioned lever; a rod; a chain connecting the rod to a fixed point near the lower portion of the mast; and means for drawing down the boom so that when the boom is near its lowest position the gripping mechanism will be operated so as to engage the bundles which are in position and transfer them to a basket to form a shock.

27. The combination of a shocker, a cradle to receive two bundles of grain arranged side by side; a basket in which the shock is formed; a mast; a boom on the mast; means for turning the boom with the mast and for raising and lowering the boom; gripping mechanism on the end of the boom; means for actuating the gripping mechanism so that it will engage two bundles in the cradle and transfer them to the basket; means for turning the gripping mechanism and the bundles end for end when the boom moves from the cradle to the basket; means for spreading the fingers of the gripping mechanism when the boom is lowered so that the fingers will pass on the outside of the bundles; means for releasing the fingers so that they will engage the bundles; mechanism for again spreading the fingers when the gripping mechanism is over the basket; and means for allowing the basket to fall when a certain number of bundles has been located in the basket to form a shock.

28. The combination of a shocker arranged to be attached to a reaper and binder; a cradle; means for operating the elements of the cradle so that two bundles will be arranged therein side by side with their butts separated; a basket in which the bundles are allowed to form a shock; means for discharging the basket; a mast; a boom on the mast; gripping mechanism on the boom arranged to engage the bundles and transfer them from the cradle to the basket; an operating axle; clutch mechanism on the axle controlling the movement of the basket; clutch mechanisms on the axle controlling the movement of the boom and the mast; clutch mechanism on the axle controlling the movement of the elements of the cradle; independent means for operating the clutch mechanisms; and means for controlling the operating mechanisms from a moving part of the binder.

29. The combination of a cradle for receiving grain from a binder, said cradle having a set of fixed arms and a set of movable arms; means for raising and lowering the movable arms; an axle; gearing on the axle connected to said means; a clutch on the axle arranged to throw the gearing into and out of action with the axle; a wheel; means for actuating the wheel from the binder; and means, on the wheel controlling the movement of the clutch, the parts being timed with the binder so that as one bundle after another is discharged from the binder they are received by the moving parts of the cradle and carried into position to be engaged by a gripping mechanism by which they are transferred to a basket, in which the shock is formed.

30. The combination in a shocker adapted to be connected to a reaper and binder, of a cradle consisting of fixed and movable arms; a dividing board in the cradle; an axle; clutch mechanism on the axle; means including bevel gears connected to the clutch mechanism for operating the moving elements of the cradle; a ratchet wheel; a lever having a pawl engaging the ratchet wheel; a link connecting the lever with one of said bevel gears controlled by the said clutch; a shifting lever for the clutch; a spring rod for holding the lever out of engagement; a cam on the other bevel gear engaging the rod; a lever for withdrawing the rod out of engagement with the cam and allowing the clutch lever to move the clutch into engagement; and a rod connected with a moving element of the binder so that the cradle mechanism is timed with the binder.

31. The combination in a shocker, of a basket arranged to receive bundles from a binder to form a shock; means for allowing the basket to fall to discharge its load; an arm pivoted to the upper side of the basket; a spring for holding the arm in either a vertical or a horizontal position; a lever connected to the arm; and means on the frame of the machine for tripping the lever to move the arm so that it will assume a horizontal position and hold the bundles in the basket as the basket falls with its load.

32. The combination in a shocker, of a frame; a basket supported in elevated position on said frame and arranged to receive bundles from a binder to form a shock; a bar pivoted to the frame; a chain connecting the bar with the basket; a latch holding the bar in position; a rock shaft having arms supporting the lower rear edge of the basket and having an arm controlled by the bar so that when the bar is released the shaft will rock and will allow the rear end of the basket to be lowered; an arm pivoted to the upper side of the basket; a spring for holding the arm in either a vertical or a horizontal position; a lever connected to the arm, and means on the frame of the machine for tripping the lever to move the arm so that it will assume a horizontal position and hold the bundles in the basket as the basket falls with its load.

33. The combination in a shocker, of a frame; a basket disposed in elevated position on said frame and arranged to receive bundles from a binder to form a shock, a fixed support extending upwardly from the frame; arms pivotally carried by said frame; said arms and fixed support supporting the bottom of said basket; means for pivotally moving said arms to lower the rear end of the basket and thereby cause the basket to fall to the ground, and bundle holding means arranged to extend over the top of the basket when the basket is falling to the ground.

34. The combination in a shocker, of a frame; a basket disposed in elevated position on said frame and arranged to receive bundles from a binder to form a shock; movable supporting means carried by said frame and cooperating with the lower rear edge of said basket; fixed supporting means extending upwardly from said frame and cooperating with the bottom of said basket forwardly of said movable supporting means; said movable and fixed supporting means supporting said basket in elevated position; means for moving said movable supporting means to lower the rear end of the basket and thereby cause the basket to fall to the ground; and bundle holding means arranged to extend over the top of the basket when the basket is falling to the ground.

35. The combination in a shocker, of a frame; a basket disposed in elevated position on said frame and arranged to receive bundles from a binder to form a shock; means to support the bottom of said basket; means for lowering the rear end of said basket to cause said basket to fall to the ground; a bundle holding member disposed adjacent the top of said basket; and means for moving said member so that it will extend over the top of the basket to hold the bundles in the basket as the basket falls with its load.

36. The combination in a shocker, of a frame; a basket disposed in elevated position on said frame and arranged to receive bundles from a binder to form a shock; movable supporting means carried by said frame and cooperating with the lower rear edge of said basket; fixed supporting means extending upwardly from said frame and cooperating with the bottom of said basket forwardly of said movable supporting means; said movable and fixed supporting means supporting said basket in elevated position; and means for moving said movable supporting means to lower the rear end of the basket and thereby cause the basket to fall to the ground.

37. The combination of a basket arranged to receive bundles of grain from a binder, said basket having a fixed bottom and sides adjustably mounted on the bottom so as to be bodily moved towards or from each other; and a partition adjustably mounted on the bottom and located within the basket.

38. The combination in a shocker, of a basket arranged to receive bundles from a binder, said basket having an inclined bottom; vertical sides arranged at an incline in respect to each other and adjustably secured to the bottom so that they can be moved towards or from each other; and a partition in the basket extending to a point above the sides and having a tapered end, said partition being adjustably mounted on the bottom of the basket.

39. The combination of a reaper and binder; a frame connected thereto; a cradle and a basket on the frame; gripping mechanism, also on the frame, for transferring bundles of grain from the cradle to the basket; timing mechanism for controlling the operation of the basket; bundle forming mechanism on the binder; a lever thereon; a link connecting said lever to a crank arm on the frame; an axle and a traction wheel thereon; a clutch on the axle; a clutch lever having a rod; an arm on the crank arranged to engage the rod; a gear wheel loose on the axle with which the clutch engages; a lug on the gear wheel for throwing the clutch out of engagement; a gear wheel with which the first mentioned gear is in mesh; a ratchet wheel; an arm having a pawl engaging said wheel; a link connecting the last mentioned gear wheel with the arm; pins on said ratchet wheel; a second clutch on the axle controlling the movement of the gripping mechanism and the timing mechanism for the basket; and a lever arranged to release the last mentioned clutch to allow it to actuate said mechanism, said lever being controlled by the pins on the ratchet wheel.

40. The combination in a grain shocker, of a cradle for receiving bundles of grain from a binder; a basket in which the bundles are placed to form a shock; means for releasing the basket to discharge the shock; means for transferring two bundles at a time from the cradle to the basket; and means for turning the bundles end for end as they are transferred, said transferring means being so timed as to dwell during the period the two bundles are being assembled and the basket mechanism being so timed as to allow the basket to discharge a shock and return without interfering with the continuous operation of the other mechanism of the shocker.

41. The combination in a grain shocker, of a cradle for receiving two bundles of grain, one after the other, from a binder; a basket in which the bundles are placed to form a shock; means for releasing the basket to discharge a formed shock; means for transferring two bundles at a time from the cradle to the basket and for turning the bundles end for end; and timing mechanism for the transferring means, so that said mechanism will dwell, as regards lateral movement, while the bundles are being received from the binder and will move down to engage the bundles as the second bundle is being placed in position.

42. The combination of a reaper and binder; a frame attached to the binder, a cradle and a basket on said frame arranged side by side; a pivoted gripping device for transferring bundles of grain from the cradle to the basket; means for automatically releasing the basket to discharge a shock when a given number of bundles has been placed in the basket; an axle; traction wheels for driving said axle; clutches on the axle through which motion is imparted to the elements of the machine; a rod; means on the binder for intermittently actuating said rod; and means connected to said rod for operating the clutch mechanism.

43. The combination of a cradle; a basket; a boom having gripping mechanism arranged to engage bundles in the cradle and transfer them to the basket, driving means for the boom including a worm and worm gearing, whereby the boom is rigidly held in the position in which it is stopped in its passage.

44. The combination of a binder; means for receiving one bundle after another from the binder; means for gripping two bundles at a time and turning them end for end; a basket arranged to receive the bundles from the gripping means with the heads of the bundles towards the front to allow the basket to turn with the bundles therein so as to discharge the bundles onto the ground to form a shock; means for releasing the basket and allowing it to remain momentarily at rest while the shock formed by the bundles is settling and while the binder is moving continuously forward; and means for withdrawing the basket from the formed shock and returning it to its first position.

45. The combination of a binder; means for receiving bundles from the binder as they are formed; grippers arranged to carry two bundles and turn them end to end; a basket, said basket having a central partition therein so that when the two bundles are discharged from the gripper, one bundle will pass on one side and the other on the opposite side of the partition, said basket and partition being so arranged that the heads of the grain will be held close together; means for discharging the basket with the bundles of grain therein; means for momentarily allowing the basket to remain stationary with the shock formed by the bundles; and means for withdrawing the basket from the shock and returning it to its normal position, the grain forming the shock being arranged in two rows with a space between the rows.

In testimony whereof, I hereunto affix my signature this 26th day of July, 1926.

GEORGE INNES.